(12) United States Patent
Marcellin et al.

(10) Patent No.: US 7,580,582 B2
(45) Date of Patent: Aug. 25, 2009

(54) METHODS FOR DECODING CORRUPT JPEG2000 CODESTREAMS

(75) Inventors: Michael W. Marcellin, Tucson, AZ (US); Ali Bilgin, Tucson, AZ (US); Zhenyu Wu, Tucson, AZ (US)

(73) Assignee: Arizona Board of Regents on behalf of the University of Arizona, Tucson, AZ (US)

( * ) Notice: Subject to any disclaimer, the term of this patent is extended or adjusted under 35 U.S.C. 154(b) by 706 days.

(21) Appl. No.: 10/534,620

(22) PCT Filed: Nov. 15, 2003

(86) PCT No.: PCT/US03/36213

§ 371 (c)(1),
(2), (4) Date: May 11, 2005

(87) PCT Pub. No.: WO2004/047010

PCT Pub. Date: Jun. 3, 2004

(65) Prior Publication Data

US 2006/0056706 A1 Mar. 16, 2006

Related U.S. Application Data

(60) Provisional application No. 60/426,830, filed on Nov. 15, 2002.

(51) Int. Cl.
*G06K 9/36* (2006.01)
(52) U.S. Cl. .................. 382/233; 382/232; 382/236; 382/238
(58) Field of Classification Search .................. 382/232, 382/233, 236, 238; 341/50, 59; 375/E7.029, 375/E7.229; 714/755, 800
See application file for complete search history.

(56) References Cited

OTHER PUBLICATIONS

ISO/IEC 15444-1, "JPEG2000 Image Coding System," 2000.
Taubman et al., JPEG2000 Image Compression Fundamentals, Standards and Practice, Kluwer Academic Publishers, Massachusetts, 2002.

(Continued)

*Primary Examiner*—Anh Hong Do
(74) *Attorney, Agent, or Firm*—Quarles & Brady LLP; Gavin J. Milczarek-Desai

(57) ABSTRACT

The present invention provides a method for decoding corrupt codestreams for encoded digital imagery and video and, in particular, JPEG2000 codestreams with improved error resilience properties. The decoding techniques apply to a class of coding algorithms in which the data from underlying images are partitioned, typically to allow decoding of different spatial sections of the image, and the rules governing the dependencies within and perhaps between partitioned sets are known. Corrupt codestreams are decoded with improved image quality by observing the partitions imposed by the underlying algorithm (200), detecting an error in a partition set (202), analyzing the dependencies within and perhaps between the partitions (204), determining what sections of encoded data that follow the error in the partition set can be salvaged (206), and decoding those sections (208). Even though there might be errors in a particular partition, portions of that partition might still be completely or partially decodable, depending on certain modes or "switches" used during the creation of the codestream.

29 Claims, 17 Drawing Sheets

OTHER PUBLICATIONS

Marcellin, et al., "An Overview of JPEG-2000," Data Compression Conference, pp. 523-541, Mar. 2000, Snowbird, UT.

Marcellin, et al. An Overview of JPEG-2000. Data Compression Conference 2000, pp. 1-19, especially pp. 6-14.

Sanchez et al. Robust Transmission of JPEG2000 Images Over Noisy Channels. IEEE Jun. 2002, pp. 451-456, especially pp. 451-453.

Chiang et al. Efficient Pass-Parallel Architecture for EBCOT in JPEG2000. IEEE May 2002, pp. 773-776.

Man et al. An Error Resilient Coding Technique for JPEG2000. IEEE 2000, pp. 3640367.

Taubman et al. JPEG2000; Standard for Interactive Imaging. IEEE Aug. 2002, pp. 1336-1357.

Lee et al. Bit-Plane Error Recovery Via Cross Subband for Image Transmission in JPEG2000. IEEE Aug. 2002, pp. 149-152.

Pavlidis et al. JPEG2000 Over Noisy Communication Channels the Cost Analysis Aspect. IEEE Jun. 2002, pp. 561-564.

Wu et al. Unequal Error Protection for Transmission of JPEG2000 Codestreams Over Noisy Channels. IEEE Sep. 2002, pp. 213-216.

"Next Generation Video Coding System JPEG 2000," Feb. 13, 2001, 18 pages, WHITE Seres No. 209Kawachi Ken, TRICEPS Corp, Tokyo, Japan.

METHODS FOR DECODING CORRUPT JPEG2000 CODESTREAMS

CROSS-REFERENCE TO RELATED APPLICATIONS

This application claims benefit of priority under 35 U.S.C. 119(e) to U.S. Provisional Application No. 60/426,830 entitled "Methods for Decoding Corrupt JPEG2000 Codestreams" filed on Nov. 15, 2002, and to International Application No. PCT/US03/36213, filed on Nov. 15, 2003, the entire contents of which are incorporated by reference.

U.S. GOVERNMENT RIGHTS

This invention was made with Federal Government support under Contract Number CCR-9979310 awarded by the National Science Foundation. The Federal Government has certain rights in the invention.

BACKGROUND OF THE INVENTION

1. Field of the Invention

This invention relates to the error resilience properties of image coding, and in particular the JPEG2000 image coding algorithm and more specifically to methods for improving error resilience performance in digital images, JPEG2000 images and image video sequences.

2. Description of the Related Art

As the applications utilizing digital imagery continue to expand, the amount of digital imagery produced and processed grows rapidly. One of the key technologies fueling this growth is image compression. Since the amount of data in images can be quite large, images are almost never transmitted or stored without compression. Image compression aims to represent an image with as few bits as possible while preserving the desired level of quality. Compression can be used to reduce the channel bandwidth needed for transmission or the storage requirements of the image.

Standardization of image compression techniques facilitates easy exchange of images and significantly reduces the cost of specialized hardware and software used in image compression systems. It would be extremely difficult to browse the Internet if each web site used its own image compression technique. Different image compression software would need to be downloaded and installed each time you visit a new site.

Arguably, the most successful image compression standard has been the JPEG (Joint Photographic Experts Group) standard developed by a joint committee of the International Standards Organization (ISO) and the International Electrotechnical Committee (IEC). A large fraction of the images that are published on the Internet have been compressed using JPEG.

Since the original JPEG standardization effort, there have been many advances in image compression technology. Several new image compression techniques that offer not only improved compression performance but also enhanced functionality have been introduced. Furthermore, ISO/IEC joint committee has identified several areas where current standards fail to address or produce satisfactory results. Thus, in 1996, the development of a new standard was initiated. This new standardization effort was scheduled to produce an International Standard in the year 2000; hence the standard was named JPEG2000. See ISO/IEC 15444-1, "JPEG2000 Image Coding System," 2000 and D. S. Taubman and M. W. Marcellin, JPEG2000: Image Compression Fundamentals, Practice and Standards, Kluwer Academic Publishers, Massachusetts, 2002.

Besides providing state-of-the-art compression performance, JPEG2000 offers a number of functionalities that address the requirements of emerging imaging applications. JPEG2000 creates a framework where the image compression system acts more like an image processing system than a simple input-output storage filter. The decision on several key compression parameters such as quality or resolution can be delayed until after the creation of the codestream, and several different image products may be extracted from a single codestream. This new framework enhances the efficacy of existing imaging applications and enables emerging ones.

JPEG2000 utilizes a context-based arithmetic bitplane coder for entropy coding. The operation of this coder is highly dependent on the state of the system, and it is crucial to maintain synchronization between the encoder and the decoder. A single bit error in the arithmetically coded segments of the bitstream can destroy this synchronization, and could result in erroneous decompression.

Motion JPEG2000 is a part of the JPEG2000 standard for handling video. Motion JPEG2000 itself defines a file format that contains one or more motion sequences of JPEG2000 images, audio, timing information and metadata. Motion JPEG2000 uses no inter-frame coding. Each image in the video sequence is coded using JPEG2000. Other video formats may be used to handle sequences of JPEG2000 images.

Overview of JPEG2000

JPEG2000 is the new international image compression standard (ISO/IEC 15444-1, "JPEG2000 Image Coding System," 2000). JPEG2000 offers state-of-the-art compression performance as well as improved functionality over previous compression standards. In particular, the error resilience properties of the JPEG2000 standard offer several mechanisms to combat errors in the codestream. Although the JPEG2000 standard specifies only the decoder and codestream syntax, a representative encoder is described to enable a more readable explanation of the algorithm and comprehension of the error resilience properties. A more balanced review can be found in M. W. Marcellin, M. J. Gormish, A. Bilgin and M. P. Boliek, "An overview of JPEG-2000", Data Compression Conference, pp. 523-541, March 2000, Snowbird, Utah. For a comprehensive overview of JPEG2000, see D. S. Taubman and M. W. Marcellin, JPEG2000: Image Compression Fundamentals, Practice and Standards, Kluwer Academic Publishers, Massachusetts, 2002.

The basic block diagram of a JPEG2000 encoder 10 is illustrated in FIG. 1. Here, the input image 12 is first divided into non-overlapping rectangular tiles 14. If the image has multiple components, an optional component transform 16 can be applied to decorrelate the components. The samples of each component that fall into a particular tile are referred to as a tile-component. Each tile-component is then transformed using a wavelet transform 18 and the wavelet subbands are partitioned into several different geometric structures, as illustrated in FIG. 2. These geometric structures are instrumental in enabling low memory implementations and providing spatial random access, and contribute to the error resilience of the codestream.

The smallest geometric structure in JPEG2000 is the codeblock. Codeblocks are formed by partitioning the wavelet subbands. As illustrated in FIG. 2, the codeblocks 28 of particular resolutions are grouped together to form precincts 30*a*, 30*b*, and 30*c* (lowest to highest resolution). Once the wavelet subbands are quantized 20, each codeblock is compressed individually using a bitplane coder 22. The bitplane coder makes three passes over each bitplane of a codeblock. These passes are referred to as coding passes or subbitplanes. The compressed data from each codeblock can be regarded as an embedded codeblock bitstream 24. The JPEG 2000 codestream 26 is then generated 27 to comprise a different number of coding passes from each individual codeblock bitstream 24, based on any desired criteria.

Bitplane Coding

As mentioned in the previous section, entropy coding is performed independently on each codeblock. This coding is carried out as context-dependent, binary, arithmetic coding of bitplanes. The arithmetic coder employed is the MQ-coder as specified in the JBIG-2 standard (ISO/IEC 14492, "Information Technology—Lossy/Lossless Coding of Bi-Level Images, 1999).

Consider a quantized codeblock to be an array of integers in sign-magnitude representation. Let q[n] denote the quantization index at location $n=[n_1, n_2]$ of the codeblock. Let $$\chi[n] \triangleq \text{sign}(q[n]) \text{ and } v[n] \triangleq |q[n]|$$

denote the sign and magnitude arrays, respectively. $\chi[n]$ is indeterminate when q[n]=0. However, this case will not cause any problems, since the sign need not be coded when q[n]=0. Then, consider a sequence of binary arrays with one bit from each coefficient. These binary arrays are referred to as bitplanes. One such array can store the signs of each coefficient, e.g. sign plane 32, as illustrated in FIG. 3*a*. Let the number of magnitude bitplanes for the current subband be denoted by $K_{max}$. The topmost magnitude bitplane 34 contains the most significant bit (MSB) of all the magnitudes. The next bitplane contains the next MSB of all the magnitudes, continuing in this fashion until the final bitplane 36 that consists of the LSBs of all the magnitudes.

Let $$v^{(p)}[n] \triangleq \lfloor v[n]/2^p \rfloor$$

denote the value generated by dropping p LSBs from v[n]. The "significance" of a sample at bitplane p is then defined by $$\sigma^{(p)}[n] = \begin{cases} 1 & v^{(p)}[n] > 0 \\ 0 & v^{(p)}[n] = 0 \end{cases}$$

Thus, a sample at location n is said to be significant with respect to bitplane p, if $\sigma^{(p)}[n]=1$. Otherwise, the sample is considered to be insignificant. For a given codeblock in the subband, the encoder first determines an appropriate number of bitplanes, $K \leq K_{max}$, that are required to represent the samples in the codeblock. Typically, K is selected as the smallest integer such that $v[n]<2^K$ for all n. The number of bitplanes (starting from the MSB) that are identically zero, $K_{msbs}=K_{max}-K$, is signaled to the decoder as side information. The $K_{max}$ of each subband is also available at the decoder. Then, starting from bitplane K−1, each bitplane is encoded in three passes (referred to as coding passes).

The scan pattern 38 followed for the coding of bitplanes, within each codeblock (in all subbands), is shown in FIG. 3*b*.

This scan pattern is followed in each of the three coding passes. The decision as to which pass a given bit is coded in is made based on the significance of that bit's location and the significance of neighboring locations. All bitplane coding is done using context dependent binary arithmetic coding with the exception that run coding is sometimes employed in the third pass. Let us define σ[n] as the "significance state" of a sample during the coding process. σ[n] is set to zero for all samples at the start of the coding process and it is reset to one as soon as the first non-zero magnitude bit of the sample is coded.

The first pass in a new bitplane is called the significance propagation pass. A bit is coded in this pass if its location is not significant, but at least one of its eight-connected neighbors is significant. In other words, a bit at location n is coded in significance propagation pass, if σ[n]=0 and $$\sum_{k_1=-1}^{1} \sum_{k_2=-1}^{1} \sigma[n_1+k_1, n_2+k_2] \geq 1$$

If a bit is coded and the bit that is coded is 1, the sign bit of the current sample is coded and σ[n]=0 is set to 1 immediately.

In JPEG2000, the probability estimate that is used to drive the arithmetic coder is selected depending on the context of the current bit. Furthermore, JPEG2000 employs different context models depending on the coding pass and the subband type. For significance coding, 9 different contexts are used. The context label $\kappa^{sig}[n]$ is dependent on the significance states 40 of the eight-connected neighbors 42 of the current bit 44 as is illustrated in FIG. 4. Using these neighboring significance states, $\kappa^{sig}[n]$ is formed from three quantities $$\kappa^h[n] = \sigma[n_1, n_2-1] + \sigma[n_1, n_2+1]$$

$$\kappa^v[n] = \sigma[n_1-1, n_2] + \sigma[n_1+1, n_2]$$

$$\kappa^d[n] = \sum_{k_1 \in \{-1,1\}} \sum_{k_2 \in \{-1,1\}} \sigma[n_1+k_1, n_2+k_2]$$

Table 1 shows how $\kappa^{sig}[n]$ is generated given $\kappa^h[n]$, $\kappa^v[n]$, and $\kappa^d[n]$. $\kappa^{sig}[n]$ then determines the probability estimate that will be used in arithmetic coding.

TABLE 1

Context Labels for Significance Coding.

| $\kappa^{sig}[n]$ | LL and LH Codeblocks | | | HL Codeblocks | | | HH Codeblocks | |
|---|---|---|---|---|---|---|---|---|
| | $\kappa^h[n]$ | $\kappa^v[n]$ | $\kappa^d[n]$ | $\kappa^h[n]$ | $\kappa^v[n]$ | $\kappa^d[n]$ | $\kappa^d[n]$ | $\kappa^h[n] + \kappa^v[n]$ |
| 8 | 2 | — | — | — | 2 | — | ≥3 | — |
| 7 | 1 | ≥1 | — | ≥1 | 1 | — | 2 | ≥1 |
| 6 | 1 | 0 | ≥1 | 0 | 1 | ≥1 | 2 | 0 |
| 5 | 1 | 0 | 0 | 0 | 1 | 0 | 1 | ≥2 |
| 4 | 0 | 2 | — | 2 | 0 | — | 1 | 1 |
| 3 | 0 | 1 | — | 1 | 0 | — | 1 | 0 |
| 2 | 0 | 0 | ≥2 | 0 | 0 | ≥2 | 0 | ≥2 |
| 1 | 0 | 0 | 1 | 0 | 0 | 1 | 0 | 1 |
| 0 | 0 | 0 | 0 | 0 | 0 | 0 | 0 | 0 |

"—denotes don't care."

As stated earlier, the sign bit of a sample is coded immediately after its first non-zero bit. Similar to significance coding, sign coding also employs context-modeling techniques. JPEG2000 uses 5 contexts for sign coding. The context label $\kappa^{sign}[n]$ is selected depending on the four-connected neighbors of the current sample. The neighborhood information is incorporated using the intermediate quantities $$\chi^h[n]=\chi[n_1,n_2-1]\sigma[n_1,n_2-1]+\chi[n_1,n_2+1]\sigma[n_1,n_2+1]$$

$$\chi^v[n]=\chi[n_1-1,n_2]\sigma[n_1-1,n_2]+\chi[n_1+1,n_2]\sigma[n_1+1,n_2].$$

$\chi^h[n]$ and $\chi^v[n]$ are then truncated to the range −1 through 1 to form $$\overline{\chi}^h[n]=\text{sign}(\chi^h[n])\min\{1,|\chi^h[n]|\}$$

$$\overline{\chi}^v[n]=\text{sign}(\chi^v[n])\min\{1,|\chi^v[n]|\}.$$

The sign-coding context label $\kappa^{sign}[n]$, and the sign-flipping factor, $\chi^{flip}[n]$, are then given in Table 2. The binary symbol, s, that is arithmetic coded is defined as

TABLE 2

$$s = \begin{cases} 0 & \chi[n]\chi^{flip}[n] = 1 \\ 1 & \chi[n]\chi^{flip}[n] = -1 \end{cases}$$

Context Labels for Sign Coding.

| $\overline{\chi}^h[n]$ | $\overline{\chi}^v[n]$ | $\kappa^{sign}[n]$ | $\chi^{flip}[n]$ |
|---|---|---|---|
| 1 | 1 | 14 | 1 |
| 1 | 0 | 13 | 1 |
| 1 | −1 | 12 | 1 |
| 0 | 1 | 11 | 1 |
| 0 | 0 | 10 | 1 |
| 0 | −1 | 11 | −1 |
| −1 | 1 | 12 | −1 |
| −1 | 0 | 13 | −1 |
| −1 | −1 | 14 | −1 |

The second pass is the magnitude refinement pass. In this pass, all bits from locations that became significant in a previous bitplane are coded. As the name Implies, this pass refines the magnitudes of the samples that were already significant in previous bitplanes. The magnitude refinement context label, $\kappa^{mag}[n]$, is selected as described in Table 3. In the table, $\overline{\sigma}[n]$ denotes the value of the significance state variable $\sigma[n]$ delayed by one bitplane. In other worlds, similar to $\sigma[n]$, $\overline{\sigma}[n]$ is initialized to zero at the beginning and set to one only after the first magnitude refinement bit of the sample has been coded.

TABLE 3

Context Labels for Magnitude Refinement Coding.

| $\overline{\sigma}[n]$ | $\kappa^{sig}[n]$ | $\kappa^{mag}[n]$ |
|---|---|---|
| 0 | 0 | 15 |
| 0 | >0 | 16 |
| 1 | — | 17 |

"—denotes "don't care."

The third and final pass is the clean-up pass, which takes care of any bits not coded in the first two passes. By definition, this pass is a "significance" pass, so significance coding, as described in significance propagation pass, is used to code the samples in this pass. Unlike the significance propagation pass, however, a run-coding mode may also occur in this pass. Run coding occurs when all four locations in a column of the scan 39 (see FIG. 3b) are insignificant and each has only insignificant neighbors. A single bit is then coded to indicate whether the column is identically zero or not. If not, the length of the zero run (0 to 3) is coded, reverting to the "normal" bit-by-bit coding for the location immediately following the 1 that terminated the zero run.

Anatomy of JPEG2000 Codestreams

The structure of a JPEG2000 codestream is illustrated in FIG. 5. For the purposes of forming the codestream, compressed data from each precinct are arranged to form packets 46. There can be multiple packets for each precinct, corresponding to multiple "quality layers." Each packet contains zero or more coding passes from each codeblock in the precinct. In this way, coding passes from codeblocks can be partitioned across multiple packets. Packets play an important role in the organization of data within a JPEG2000 codestream. Each packet contains a header 48 and a body 50. The packet header contains information about the contribution of each codeblock in the precinct into the packet, and the body contains coding passes of codeblocks. Packets that belong to a particular tile are grouped together to form a tile-stream 52, and tile-streams are grouped together to form the JPEG2000 codestream 54. Similar to packets, tile-streams are comprised of a header 56 and a body 58. It is possible to break a tile-stream into multiple tile-parts. In this case, the first tile-part contains a tile header and the remaining tile-parts contain tile-part headers. There is also a main header 60 at the beginning of the codestream. The EOC 62 marker denotes the end of the codestream.

Error Resilience

Entropy coding in JPEG2000 is achieved using a context-based arithmetic bitplane coder. The operation of this coder is highly dependent on the state of the system, and it is crucial to maintain synchronization between the encoder and the decoder. A single bit error in the arithmetically coded segments of the bitstream can destroy this synchronization, and could result in erroneous decompression. To combat this problem, several error resilience tools are provided within JPEG2000.

The partitioning of the codestream into different partition sets is the first line of defense. In terms of error resilience, this partitioning aims to isolate errors made in one partition set to that particular partition set, and prevent error propagation across partition set boundaries. This isolation occurs at several levels, since the codestream is organized in a hierarchical fashion. Each codestream starts with a main header. The main header contains critical information such as image and codeblock sizes, and is essential for correct decompression of the codestream. If sections of the main header are unavailable at the decoder, the decoder may not be able to decode the codestream. Similarly, if a tile-stream header is lost during transmission, the decoder might be unable to determine several parameters that will be required for correct decompression of that tile. This might result in discarding the entire tile. A similar scenario would occur, if tile-parts were utilized and the first tile-part header was lost. However, if the header of any of the remaining tile-parts were lost, the decoder would be able to decompress the earlier tile-parts and the remaining tile-parts that belong to the current tile might need to be discarded. If a packet header is lost, all of the data in the current and future packets that correspond to the corresponding precinct will have to be discarded. Since codeblocks are coded independently, errors do not propagate between codeblocks. Since coding passes from one codeblock may appear in multiple packets, errors may propagate between packets, even though packet headers are not corrupt.

JPEG2000 provides a mechanism where the packet headers can be extracted from every packet and stored in tile-part headers or the main header. This is referred to as packed packet headers. Packed packet headers can provide significant advantages for error resilience if the main and tile-part headers can be transmitted in a lossless fashion. Since the packet headers contain the lengths in bytes of all coding passes in the packet, the decoder can utilize this information to isolate errors.

Error Detection and Resynchronization

To complement the hierarchical data partitioning, JPEG2000 provides several mechanisms for error detection and resynchronization. One such mechanism is the byte-stuffing procedure in JPEG2000. Through the use of this byte-stuffing procedure, the JPEG2000 arithmetic coder does not produce certain values (0xFF90 through 0xFFFF) inside coding passes. These values, called delimiting marker codes, are reserved for codestream markers. Unexpected detection of one of these values would indicate that an error has occurred.

Some of the error detection and resynchronization mechanisms are enabled by mode variations. These alternatives to the default mode of the codec allow additional capabilities in exchange for some small decrease in compression efficiency. Mode variations are controlled by flags that are signaled inside headers. These mode switches are listed in Table 4, and are not all intended to enhance error resilience.

TABLE 4

Mode variations.

| Switch | Description |
| --- | --- |
| BYPASS | Selective MQ coder bypass |
| RESET | Reset context states |
| RESTART | Terminate and restart MQ coder |
| CAUSAL | Stripe-causal context information |
| ERTERM | Predictable termination |
| SEGMARK | Segmentation marker |

When the RESET mode is used, the context states (i.e. the probabilities used in arithmetic coding) are reset to their initial values at the end of each coding pass. If the RESET switch is not specified, this initialization occurs only prior to the first coding pass of a codeblock. Although this mode reduces the compression efficiency a little, it is useful in parallel processing applications.

The RESTART switch causes the MQ coder to be restarted at the beginning of each coding pass. Thus, when this mode is utilized, every coding pass has its own MQ codeword segment. The length of each of these segments is signaled in the packet header. Thus this mode reduces the compression efficiency and increases the amount of overhead. However, the RESTART mode is very useful for error resilience, since it increases the decoder's data recovery abilities.

The goal of the BYPASS mode is to provide reduced complexity at high rates with little loss in compression efficiency. When this mode is selected, the MQ coder is bypassed during the first (significance propagation) and second (magnitude refinement) coding passes, when p<K−4. In other words, this mode is activated only after the tenth coding pass of each codeblock. Since after the tenth coding pass, the symbols from the first two coding passes do not exhibit highly skewed probabilities for most images, this mode does not usually result in considerable reduction in compression efficiency. When the MQ coder is bypassed, the binary symbols are stored in raw segments. To avoid the appearance of the delimiting marker codes inside these raw segments, a simple bit-stuffing procedure is adopted. Insertion of raw segments into the bitstream requires the previous MQ coded segment to be terminated. The raw segments need to be terminated prior to the start of an MQ segment (clean-up coding pass) as well. If RESTART mode is selected as well, termination occurs at the end of each coding pass. The length of every terminated segment should be signaled inside the relevant packet header.

Another mode that is defined by the standard is the SEGMARK mode. If this mode is enabled, a four-symbol code ("1010") is inserted at the end of the third coding pass of each bitplane. Since a bit error in any of the coding passes is likely to corrupt at least one of these symbols, the decoder can detect that an error has occurred, and discard the erroneous coding passes.

The standard does not define a particular codeword termination policy that needs to be adopted by the encoder. In general, the encoder is free to terminate the codewords in any manner that will result in correct decoding. However, when the ERTERM mode is utilized, the encoder adopts a predictable termination policy for each MQ and/or raw codeword segment. Thus, the decoder can detect that an error has occurred in a particular coding pass.

The CAUSAL mode was defined by the standard to allow parallel processing of coding passes. When the CAUSAL mode is utilized, the context formation process is modified slightly. Recall that the scan pattern of samples within a codeblock, as shown in FIG. 3b, was a 4-sample stripe-oriented scan. In CAUSAL mode, the samples within a current stripe 64 are encoded without depending on the values of future stripes 66. Thus, when the contexts are formed, all samples from future stripes are treated as insignificant. To clarify this, assume that the sample 67 at location n is being encoded, as illustrated in FIG. 6. As seen in the figure, assume that this sample belongs to the fourth row of a stripe. If the CAUSAL mode is utilized, the significance states $\sigma[n_1+1, n_2+k_2]$ are considered to be zero, for $k_2=-1,0,1$.

Error Resilience Properties of JPEG2000

The transmission of images over lossy communication channels such as the Internet or wireless networks is a rapidly expanding market that offers additional technical challenges. When compressed images are transmitted over such channels, the compressed codestreams received at the decoder can contain errors. The decoder should be able to reconstruct images using these noisy codestreams. Many image compression methods rely on efficient entropy coders that are dependent on the state of the system. Such coders are very sensitive to errors in the codestream. The JPEG2000 standard does not define the behavior of the decoder when an error in the codestream is detected.

The operation of high performance image codecs over lossy communication channels requires careful design to avoid complete failure when the codestream gets corrupted. The design is heavily dependent on the loss characteristics of the channel. For example, suppose that the channel introduces erasures such that some of the transmitted data is not received by the decoder. Such a model is actually used to represent the transmission characteristics of the Internet. Assuming that a feedback channel is available, one approach could be to request the retransmission of lost data from the sender. This is how reliable communication is achieved over the Internet using the TCP/IP protocol. If the user receives a corrupted image (or data packet), the user discards the data and sends a message to the server that the data was corrupted. The server resends the data until it is received without error. The upside to this approach is that the image is eventually received error free. However, there are many downsides. First of all, this approach requires a feedback channel. In some cases, such a channel may not exist, or the decoder might be unwilling to contact the sender due to security concerns. If the channel experiences a lot of losses, the retransmission requests will further flood the channel and the effective bandwidth of the channel will be considerably lower. Furthermore, this approach introduces delay and may not be applicable for real-time applications.

The current practice with JPEG2000 images is to discard the current and future coding passes for a codeblock, when an error is detected in a particular coding pass. As explained earlier, the bitplanes of each codeblock are compressed starting from the MSB to the LSB. Three coding passes are performed for each codeblock. If the decoder detects an error in a particular coding pass, bitplanes reconstructed from earlier coding passes are kept and the current and future coding passes belonging to the current codeblock are discarded. Other codeblocks are not affected. This results in poor quality in the reconstructed image for the region affected by the codeblock. This practice is adopted in all existing software implementations including ISO/IEC JTC1/SC29/WG1 N2165, "JPEG2000 Verification Model 9.1 (Technical Description)," 2001; D. Taubman, "Kakadu: A comprehensive, heavily optimized, fully compliant software toolkit for JPEG2000 developers," http://www.kakadusoftware.com; M. D. Adams, "JasPer," http://www.ece.ubc.ca/~mdadams/jasper; and "JJ2000: An implementation of JPEG2000 standard in Java," http://jj2000.epfl.ch, and no alternative to this approach is present in literature.

SUMMARY OF THE INVENTION

In view of the above problems, the present invention provides decoding techniques for decoding corrupt codestreams for encoded digital imagery/video and, in particular, JPEG2000 codestreams with improved error resilience properties.

The decoding techniques apply to a class of coding algorithms such as JPEG2000 in which the underlying images are coded in a way that introduces certain known dependencies in the data. The data are partitioned into n partition sets to limit the dependencies to, for example, finite spatial regions. The possibility that n=1 corresponds to one partition set containing all the data. When an error occurs in a partition set, the dependencies within each partition set determine whether some, all or none of the remaining data in that partition set that follow the error may be salvaged. Furthermore, when an error occurs in a partition set, the dependencies between partition sets determine whether data in other dependent sets may be salvaged.

Corrupt codestreams are decoded with improved image quality by detecting an error in a partition set, analyzing the dependencies within and perhaps between the partition sets, determining what sections of the data can be salvaged when errors occur, and decoding those sections. External information on the location of errors is used when available. This is accomplished based on the observation that even though there might be errors in a particular partition set, portions of that set (and other dependent sets) might still be completely or partially decodable, depending (perhaps) on certain modes or "switches" used during the creation of the codestream.

In JPEG2000, the compressed codestream is partitioned in many levels. The codestream is first partitioned into tile-streams. Tile-steams are partitioned into packets, and packets contain coding passes from different codeblocks. Entropy coding is performed independently on each codeblock. This coding is carried out as context-dependent, binary, arithmetic coding of bitplanes. Three passes are performed over each bitplane of a codeblock and a separate bitstream is generated for each codeblock. The decision as to which pass a given bit is coded in is made based on the significance of that bit's location and the significance of neighboring locations. These passes are named significance propagation pass, magnitude refinement pass, and clean-up pass, respectively. The decoding techniques are based on the observation that even though there might be errors in earlier coding passes, some (or all) future coding passes might still be completely or partially decodable, depending on certain mode switches (RESET, BYPASS and CAUSAL) used during the creation of the codestream and whether external information is available on the location of the errors. The future coding passes that may be decodable can be partitioned between multiple packets, even though they are from the same codeblock. When an error occurs in the codestream, the decoder carefully determines how this error propagates through the codestream based on the state of these switches. The sections of the codestream that are not affected by the error are decoded rather than being discarded.

These and other features and advantages of the invention will be apparent to those skilled in the art from the following detailed description of preferred embodiments, taken together with the accompanying drawings, in which:

DETAILED DESCRIPTION OF THE INVENTION

The present invention provides decoding techniques for decoding corrupt codestreams for encoded digital imagery and video sequences and, in particular, JPEG2000 codestreams with improved error resilience properties. It is clear that the present invention is applicable when the images are part of a video sequence, whether or not the Motion JPEG2000 file format is employed.

The decoding techniques apply to a class of coding algorithms such as JPEG2000 in which the underlying images are coded in a way that introduces certain known dependencies in the data. The data are partitioned into n partition sets to limit the dependencies to, for example, finite spatial regions. The possibility that n=1 corresponds to one partition set containing all the data. The data may not be literal image pixels, but may be obtained by some processing of pixels; for example, quantized wavelet coefficients. When an error occurs in a partition set, the dependencies within each partition set determine whether some, all or none of the remaining data in that partition set that follow the error may be salvaged. Furthermore, when an error occurs in a partition set, the dependencies between partition sets determine whether data in other dependent sets may be salvaged.

Figure 1:
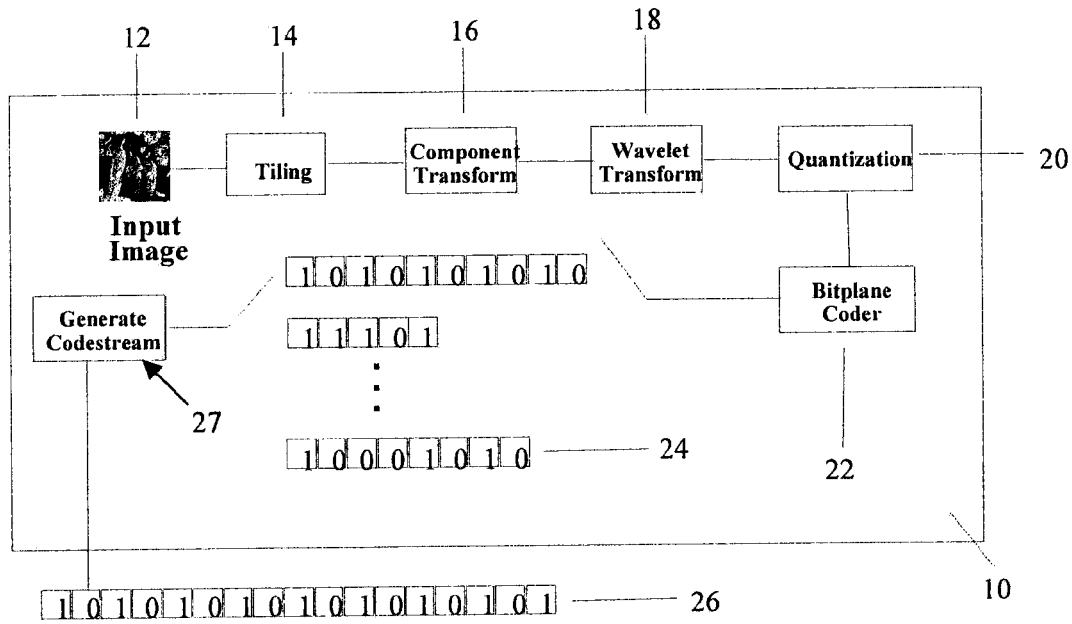
FIG. 1, as described above, is a block diagram of a JPEG2000 encoder.
Figure 2:
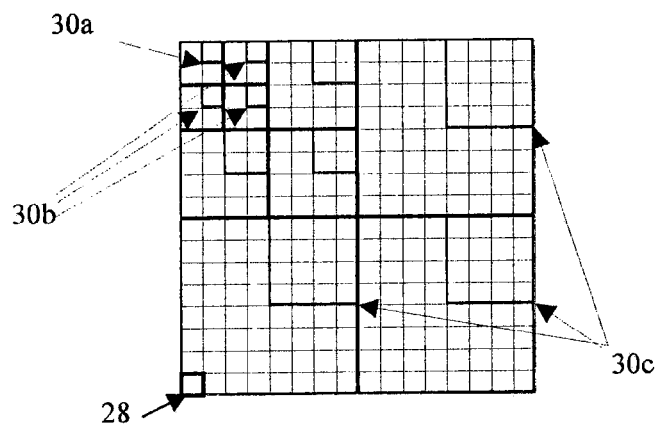
FIG. 2, as described above, is a partition of wavelet sub-bands for a tile-component.
Figure 3A:
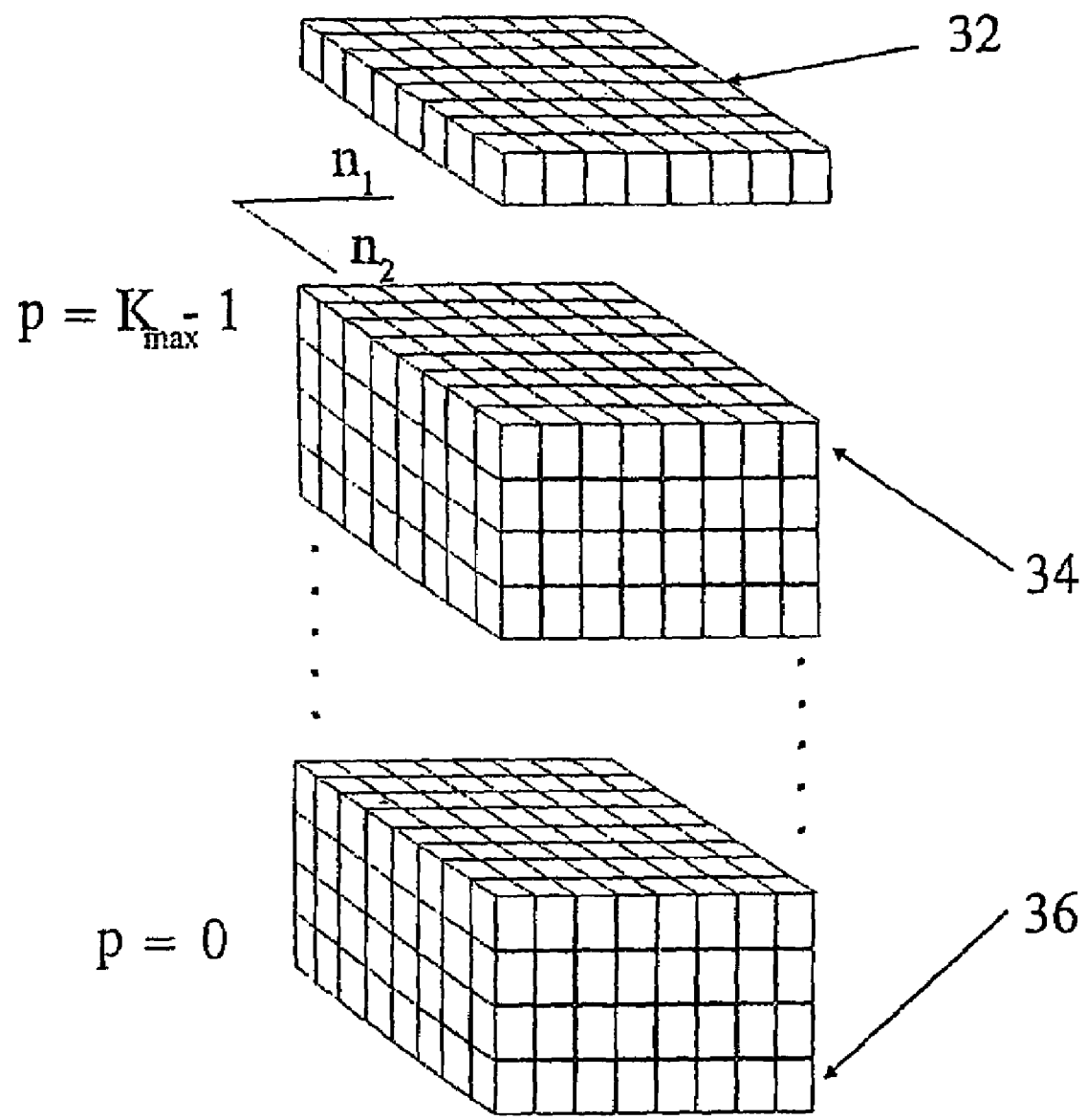
FIGS. 3a and 3b, as described above, are a bitplane representation of a codeblock and a scan pattern for bitplane coding, respectively.
Figure 3B:
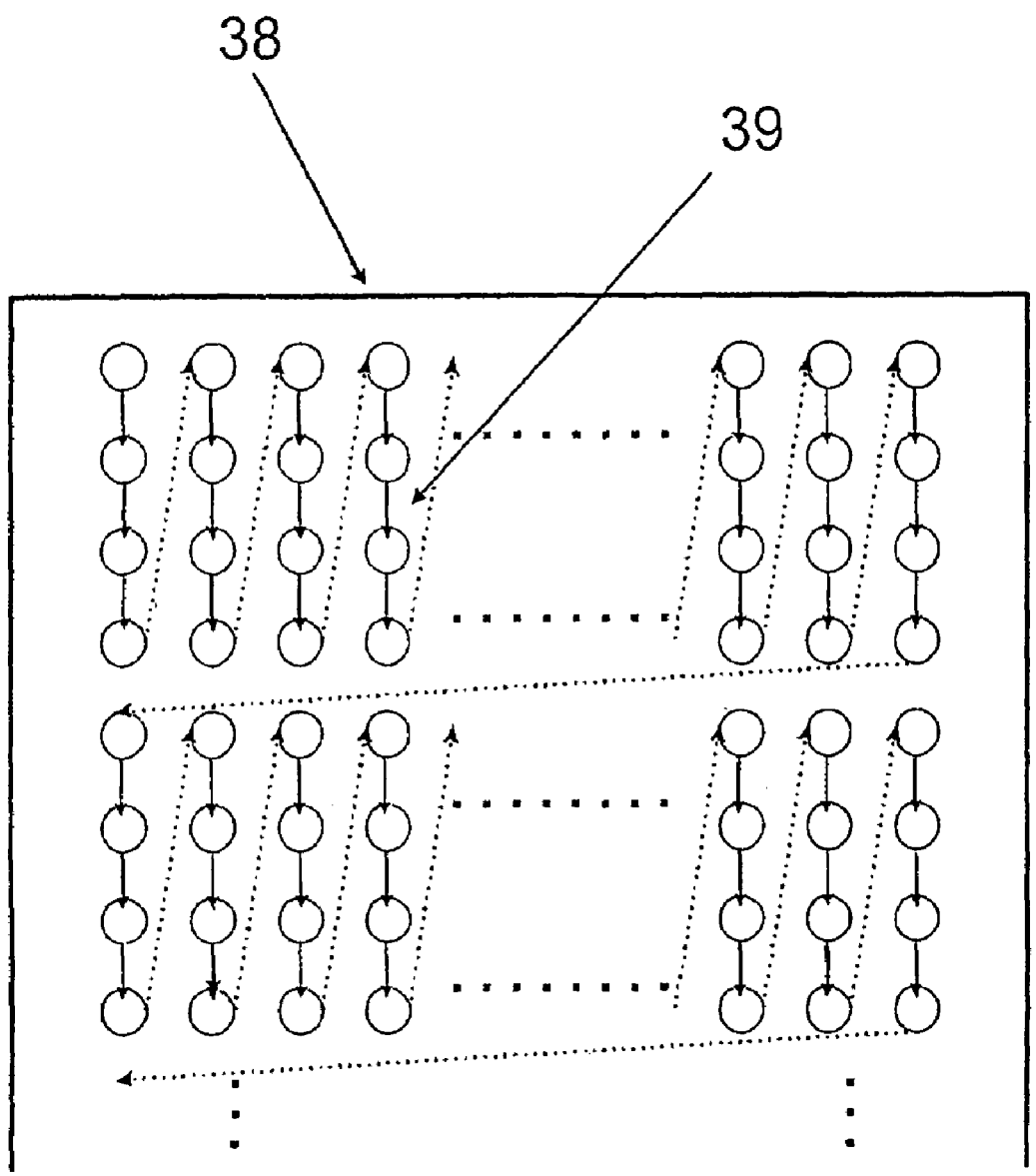
Figure 4:
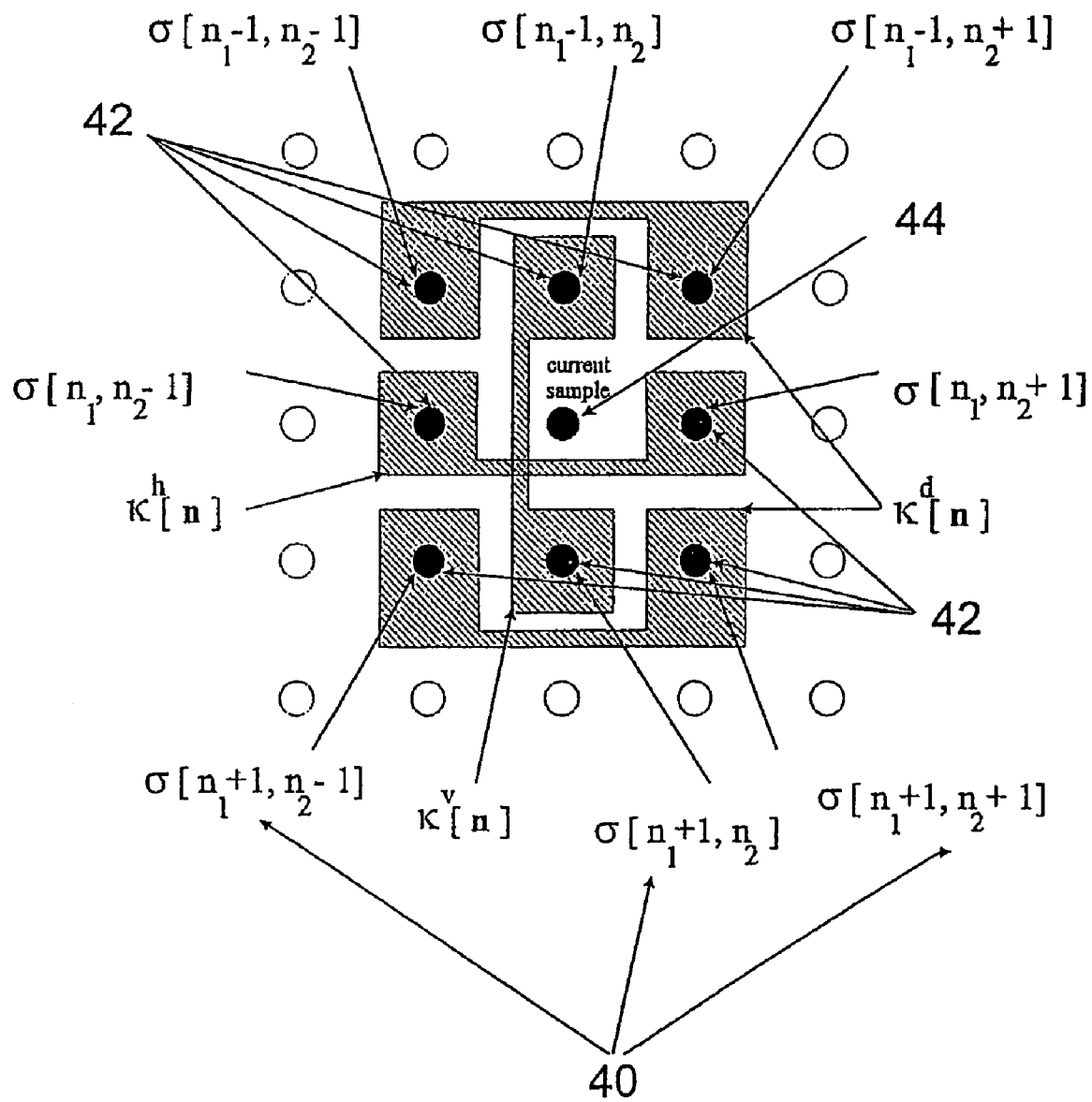
FIG. 4, as described above, is a sample neighborhood used for the formation of significance context models.
Figure 5:
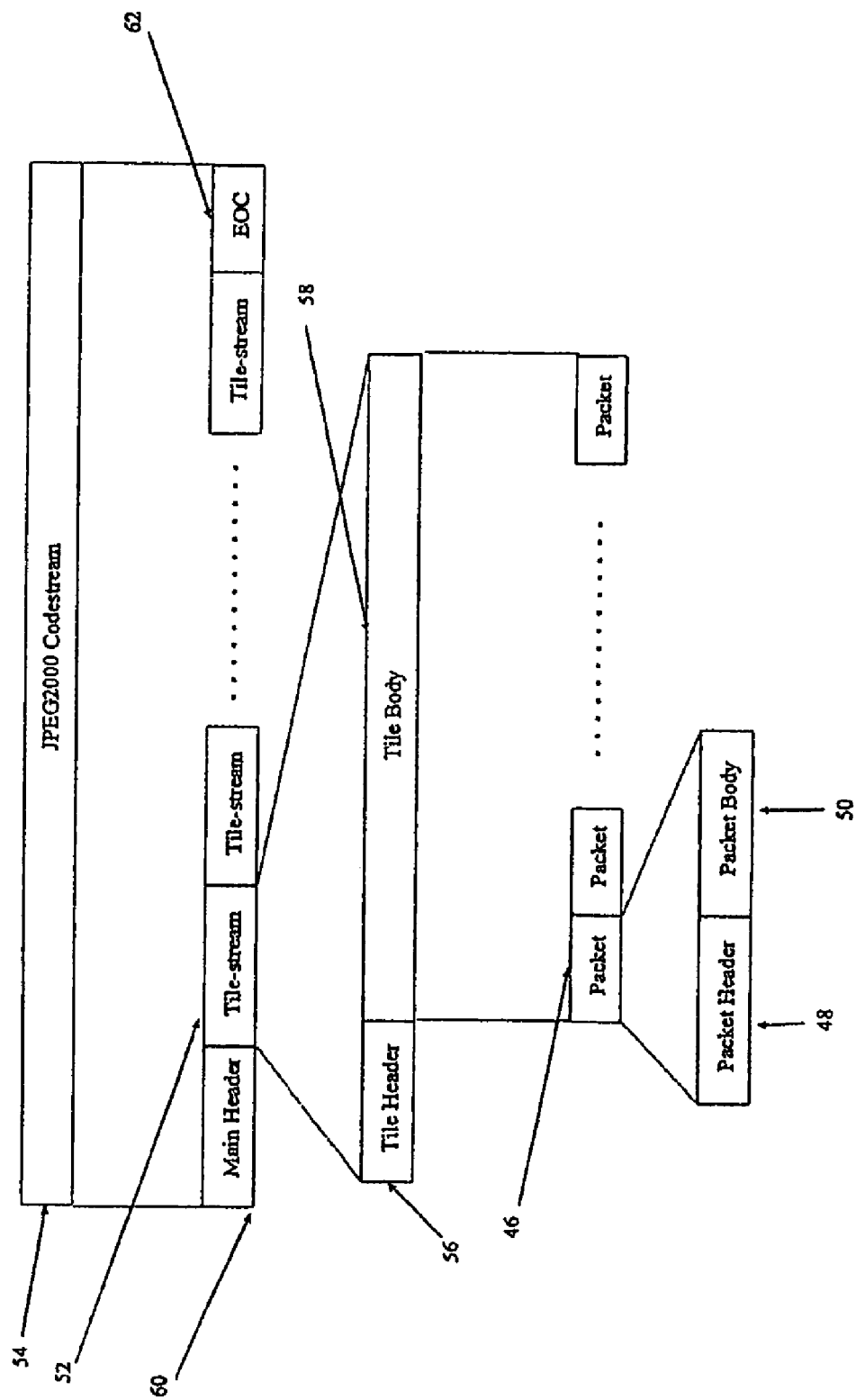
FIG. 5, as described above, is a simple JPEG2000 codestream.
Figure 6:
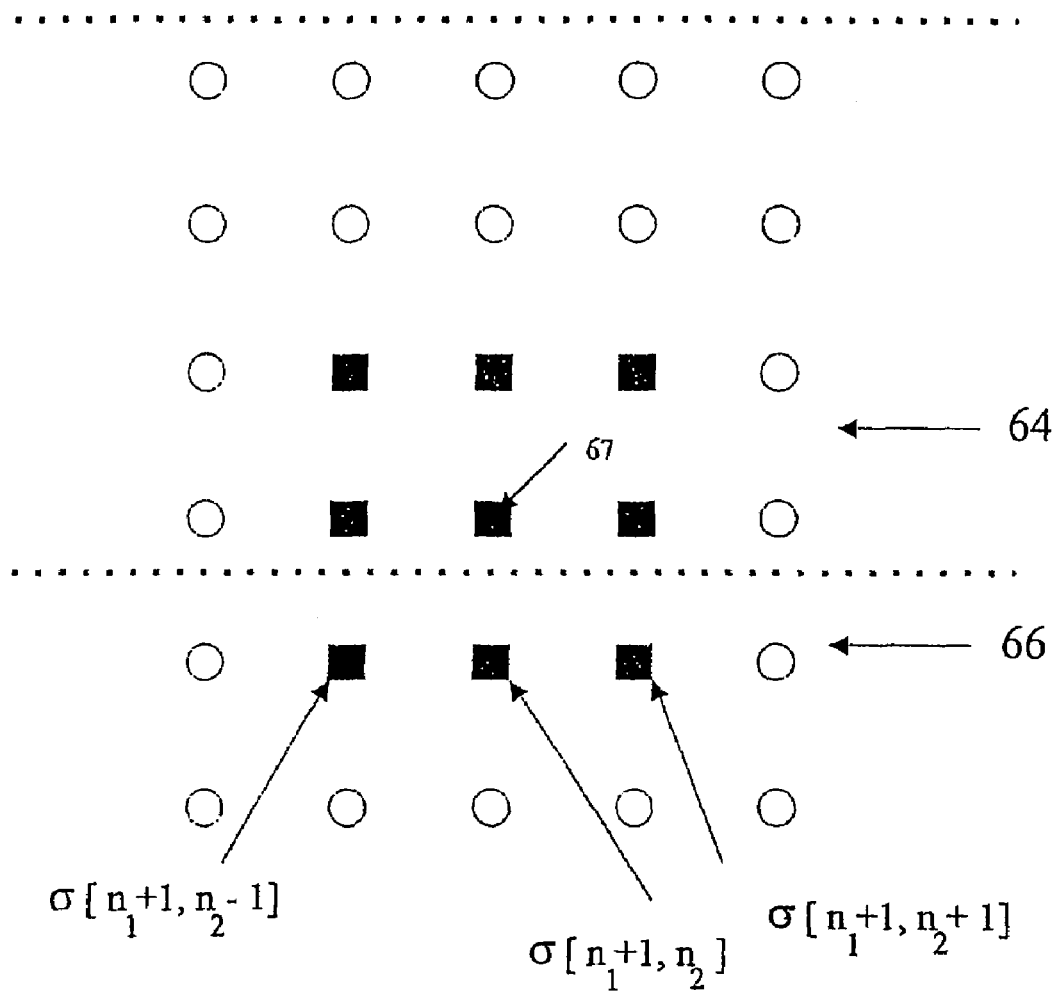
FIG. 6, as described above, illustrates the formation of contexts in CAUSAL mode.
Figure 7B:
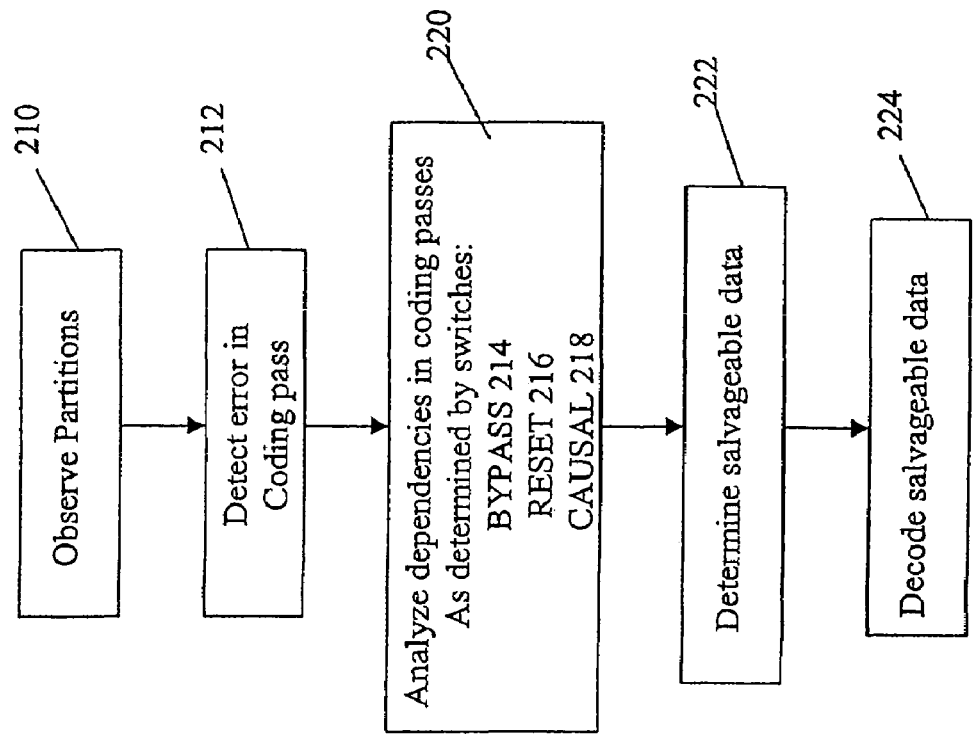
FIGS. 7a and 7b are flowcharts of the decoding techniques for decoding corrupt data in accordance with the present invention.
Figure 7A:
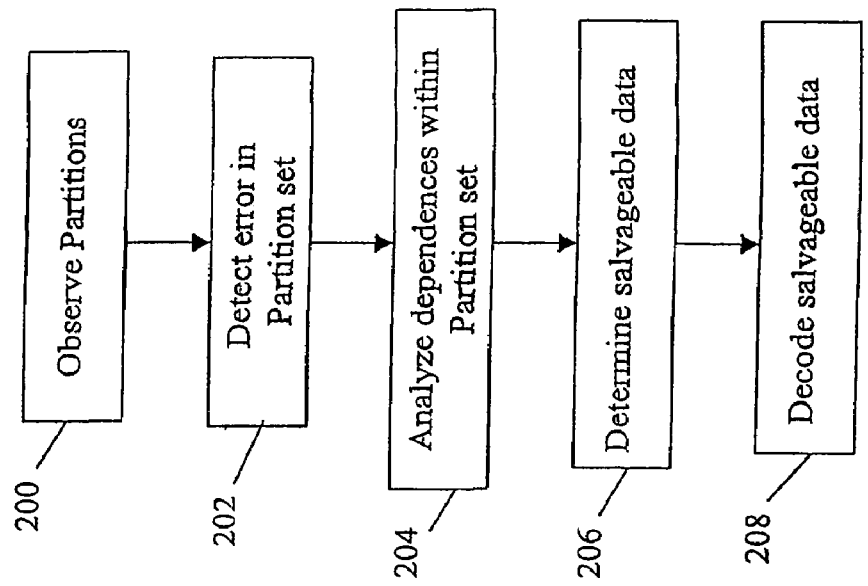

As illustrated in FIG. 7a, corrupt codestreams are decoded with improved image quality by observing the partitions imposed by the underlying algorithm (200), detecting an error in a partition set (202), analyzing the dependencies within and perhaps between the partition sets (204), determining what sections of the data can be salvaged when errors occur (206) and decoding those sections (208). External information on the location of errors is used when available. This is accomplished based on the observation that even though there might be errors in a particular partition set, portions of that set (or other dependent sets) might still be completely or partially decodable, depending (perhaps) on certain modes or "switches" used during the creation of the codestream. This is true even though the (completely or partially decodable) sections occur after the first error within a partition set; indeed, even when the decodable sections reside in another partition set dependent on the partition set in which the error occurs. This case is relevant, for example, when coding passes from a codeblock are further partitioned among multiple packets.

The decoding techniques will now be described in detail with reference to JPEG2000 but it should be understood that the principles described herein are applicable to other compression algorithms for both still and video images in which the underlying data are coded in a dependent fashion and the rules governing the dependencies are known. For example, Motion JPEG2000.

Figure 8:
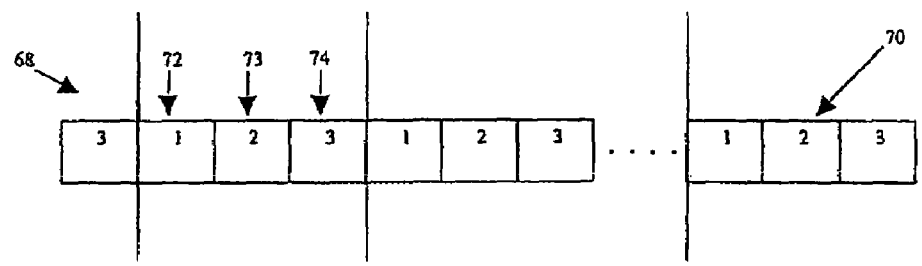
FIG. 8 is a codeblock bitstream.

As discussed above, in JPEG2000, entropy coding is performed independently on each codeblock. This coding is carried out as context-dependent, binary, arithmetic coding of bitplanes. Three passes are performed over each bitplane of a codeblock from the most significant bitplane 68 to the least significant bitplane 70 and a separate bitstream is generated for each codeblock as illustrated in FIG. 8. The decision as to which pass a given bit is coded in is made based on the significance of that bit's location and the significance of neighboring locations. These passes are named significance propagation pass 72, magnitude refinement pass 73, and clean-up pass 74, respectively.

The decoding techniques are based on the observation that even though there might be errors in earlier coding passes, some (or all) future coding passes might still be completely or partially decodable, depending on certain modes used during the creation of the codestream. To be effective, the rules governing the dependencies within and perhaps between partitioned data must be known. Specifically, as shown in FIG. 7b for JPEG2000 images, corrupt codestreams are decoded by observing the partition imposed by the JPEG2000 algorithm (210), detecting an error in a particular coding pass (212), analyzing the dependencies within the coding passes as defined by the states of the BYPASS, RESET and CAUSAL switches 214, 216, and 218 (step 220), determining what sections of the data can be salvaged when errors occur (222) and decoding those sections (224). In JPEG2000, a partition set can be a tile, a component, a tile-component, a tile-part, a precinct, a packet, or a codeblock. In the specific cases below, dependencies are analyzed within a partition set given by a codeblock. When coding passes from codeblocks are further partitioned across multiple packets, dependencies are analyzed between partition sets given by packets.

Different parts of the codeblock bitstream can be recovered under different scenarios. External information on the locations of the errors can be utilized during decoding. Such information can be gathered from channel codes that are applied to a JPEG2000 codestream prior to transmission. For packet-switched networks, such as the Internet, this information can be easily obtained from the network layer. Of particular interest is the location of the first error within a coding pass. If this information is available, partial decompression of current and future coding passes can be obtained.

Without External Error Detection

In the case where no external information on the location of errors is available, error detection is performed using the internal mechanisms of JPEG2000. It is assumed that the RESTART and ERTERM switches have been set at the encoder, which allows identification of individual coding passes and parsing of a codeblock bitstream into individual coding passes at the decoder.

Consider four different scenarios, which are determined by whether the RESET and the BYPASS switches were set to create the codestream at the encoder. For each of the four cases, consider errors that have occurred in significance propagation, magnitude refinement, and clean-up passes separately. As shown in the accompanying figures, the portions of the bitstream that need to be discarded are cross-hatched. The following labels are used to indicate different coding passes: Significance Propagation: 1, Magnitude Refinement: 2, Clean-up: 3. This results in twelve different cases that are analyzed individually.

Figure 9:
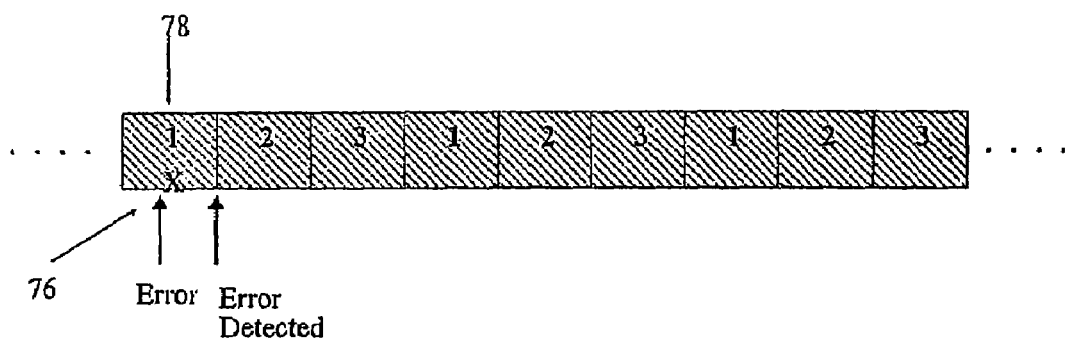
FIGS. 9-14 illustrate coding pass dependencies without external error detection in accordance with the present invention.

RESET=False, BYPASS=False, Error in Significance Propagation: When there is an error 76 in a significance propagation pass 78, $\kappa^{sig}$ and $\sigma[j]$ get corrupt. Thus, none of the following coding passes can be decoded (See FIG. 9). For every bitplane, three coding passes are performed and the decision of which coding pass a particular bit gets coded in is made based on the significance state $\sigma[j]$ of the bit, as well as that of its neighbors. Since the significance information is initialized to zero before coding starts, and updated during coding, a single error in significance information would propagate to all future coding passes. Once the significance information gets corrupt, the order in which the samples are visited within a bitplane gets corrupt. This error propagates to all future coding passes, and none of them can be decoded.

Figure 11:
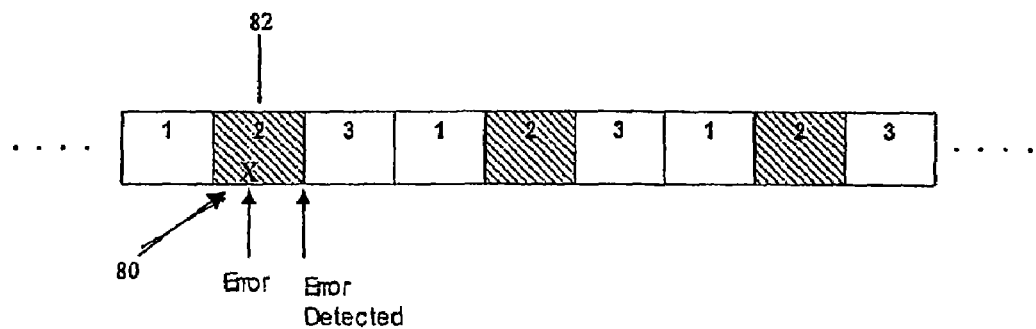

RESET=False, BYPASS=False, Error in Magnitude Refinement: When there is an error 80 in a magnitude refinement pass 82, although $\kappa^{sig}$ will not be corrupt, the state information used in arithmetic coding for magnitude refinement passes will be corrupt. Thus, all following magnitude refinement coding passes should be discarded. However, the two other types of coding passes can be decoded. See FIG. 11.

Figure 14:
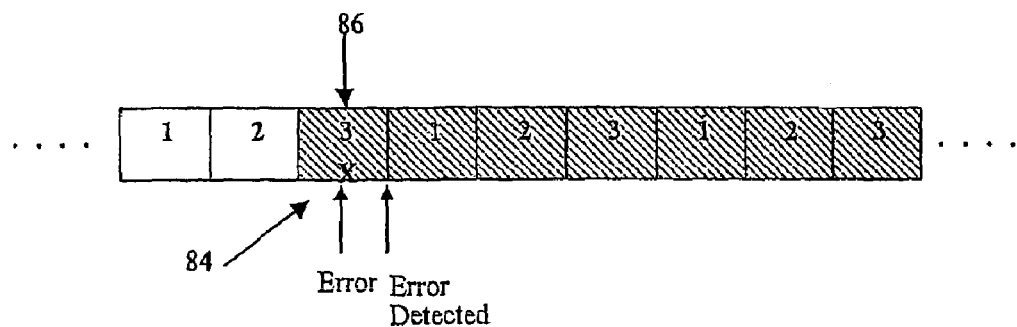

RESET=False, BYPASS=False, Error in Clean-up: Similar to the significance propagation pass, when there is an error 84 in a clean-up pass 86, $\kappa^{sig}$ and $\sigma[j]$ get corrupt. Thus, all following coding passes should be discarded. See FIG. 14.

Figure 10:
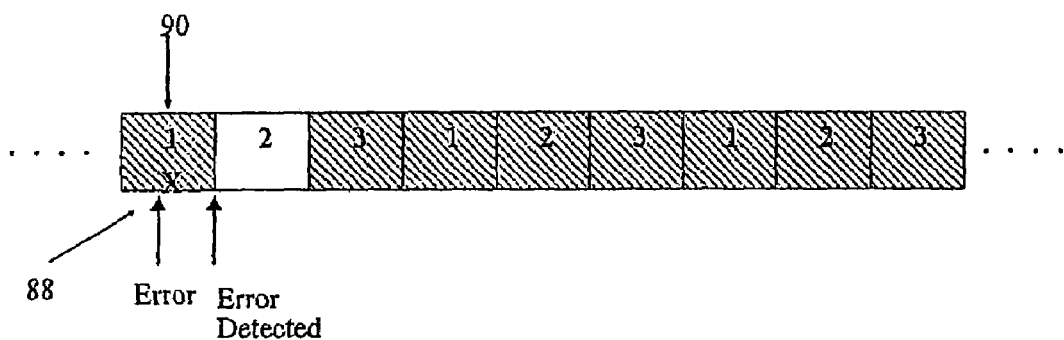

RESET=False, BYPASS=True, Error in Significance Propagation: When there is an error 88 in a significance propagation pass 90, $\kappa^{sig}$ and $\sigma[j]$ get corrupt. Although no future significance propagation or clean-up passes can be decoded, one more magnitude refinement pass can be used since the bypass option turns off arithmetic coding. See FIG. 10.

Figure 12:
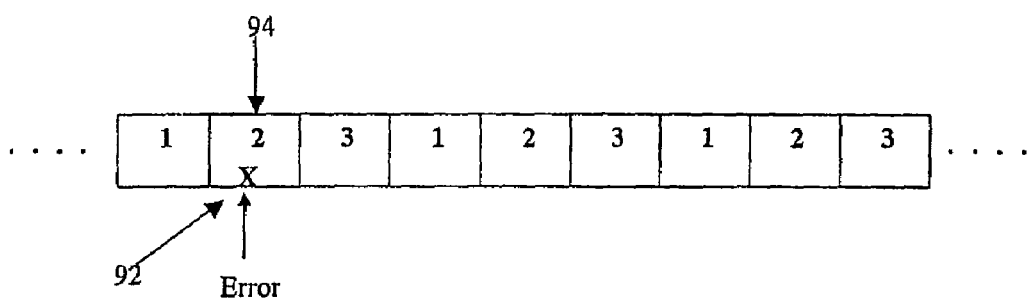

RESET=False, BYPASS=True, Error in Magnitude Refinement: Since arithmetic coding is not utilized and the bits are stored raw, a bit error 92 in magnitude refinement pass 94 only affects a single sample (Except for the case, where byte stuffing needs to be used to avoid producing restricted marker codes). Thus, the decoder should continue decoding the current and all future coding passes. See FIG. 12.

RESET=False, BYPASS=True, Error in Clean-up: When there is an error 84 in clean-up pass 86 $\kappa^{sig}$ and σ[j] get corrupt and all following coding passes should be discarded. See FIG. 14.

RESET=True, BYPASS=False, Error in Significance Propagation: When there is an error 76 in a significance propagation pass 78 $\kappa^{sig}$ and σ[j] get corrupted and arithmetic coding is utilized, all following coding passes should be discarded. See FIG. 9.

Figure 13:
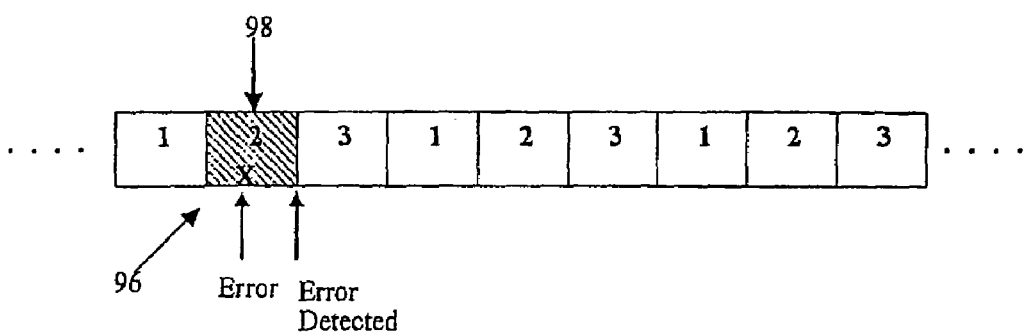

RESET=True, BYPASS=False, Error in Magnitude Refinement: An error 96 in magnitude refinement pass 98 will corrupt $\kappa^{mag}$. Since neither the significance propagation nor the clean-up passes are dependent on $\kappa^{mag}$, all such passes can be decoded. Furthermore, since the reset switch will reinitialize the $\kappa^{mag}$ for the next magnitude refinement coding pass, all future magnitude refinement coding passes can be decoded as well. See FIG. 13.

RESET=True, BYPASS=False, Error in Clean-up: When there is an error 84 in clean-up pass 86 $\kappa^{sig}$ and σ[j] get corrupt and all following coding passes should be discarded. See FIG. 14.

RESET=True, BYPASS=True, Error in Significance Propagation: When there is an error 88 in a significance propagation pass 90 $\kappa^{sig}$ and σ[j] get corrupt. Although no future significance propagation or clean-up passes can be decoded, one more magnitude refinement pass can be used since the bypass option turns off arithmetic coding. See FIG. 10.

RESET=True, BYPASS=True, Error in Magnitude Refinement: Since arithmetic coding is not utilized and the bits are stored raw, a bit error 92 in the magnitude refinement pass 94 only affects a single sample (Except for the case, where byte stuffing needs to be used to avoid producing restricted marker codes). Thus, the decoder should continue decoding the current and all future coding passes. See FIG. 12.

RESET=True, BYPASS=True, Error in Clean-up: When there is an error 84 in a clean up pass 86 $\kappa^{sig}$ and σ[j] get corrupt and all following coding passes should be discarded. See FIG. 14.

With External Error Detection

When an external mechanism for error detection is available, the information on the locations of the errors can be utilized to improve the performance of JPEG2000. There are several mechanisms that can be used to detect errors. In a packet-switched network, the data is divided into network packets and transmitted. At the decoder, some of packets may be unavailable, since they were dropped by the network due to congestion. In this scenario, the decoder would be able identify exact locations of errors in the codestream. Similarly, if error correction coding techniques were used to protect the codestream against transmission errors, the error correction decoder can be used to estimate the location of errors in the codestream. An external mechanism may be developed to locate errors inside the JPEG2000 codestream itself. In general, the external mechanism is providing additional information about the location of errors in the codestream whether the detection mechanism exists outside or inside the codestream.

The location of the first error within a coding pass is particularly important. If this location is known or can be estimated, the error free section of the coding pass can be decompressed. We refer to this as partial decoding. Furthermore, the sections of future coding passes that are only dependent on the error free portion of the current coding pass can also be decompressed.

Similar to the previous section partial decoding is dependent on the switches used to create the codestream. In addition to the RESET, and BYPASS switches, the CAUSAL switch also plays an important role in this case. It is assumed that the RESTART and ERTERM switches are set for all codestreams. The effects of the RESET and BYPASS switches on partial decoding are analyzed first. Then the CAUSAL switch effects on partial decoding are analyzed.

Figure 15:
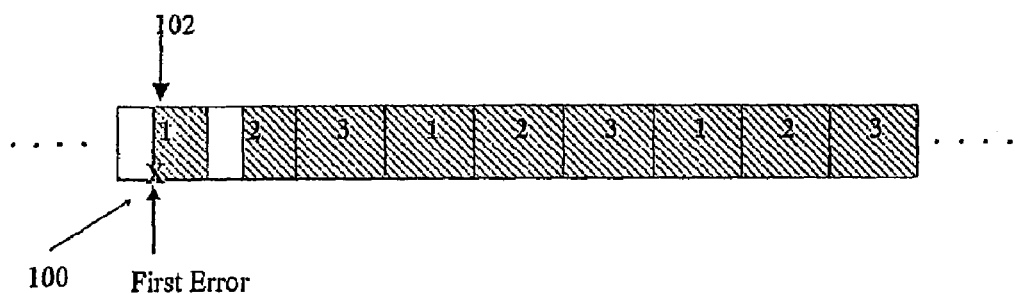
FIGS. 15-24 illustrate coding pass dependencies with external error detection in accordance with the present invention.

RESET=False, BYPASS=False, Error in Significance Propagation: When there is an error 100 in a significance propagation pass 102, $\kappa^{sig}$ and σ[j] get corrupt. Although none of the future coding passes can be decoded completely, one more magnitude refinement pass can be decoded partially. The portion of the magnitude refinement pass that can be decoded is determined by the uncorrupt portion of $\kappa^{sig}$ and σ[j]. See FIG. 15.

Figure 19:
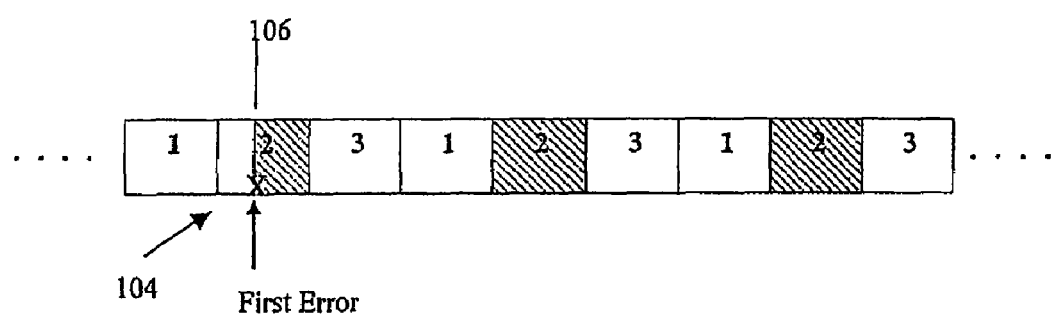

RESET=False, BYPASS=False, Error in Magnitude Refinement: When there is an error 104 in magnitude refinement pass 106, although $\kappa^{sig}$ will not be corrupt, the state information used in arithmetic coding for magnitude refinement passes will be corrupt. Thus, all following magnitude refinement coding passes should be discarded. However, the two other types of coding passes can be decoded completely. See FIG. 19.

Figure 22:
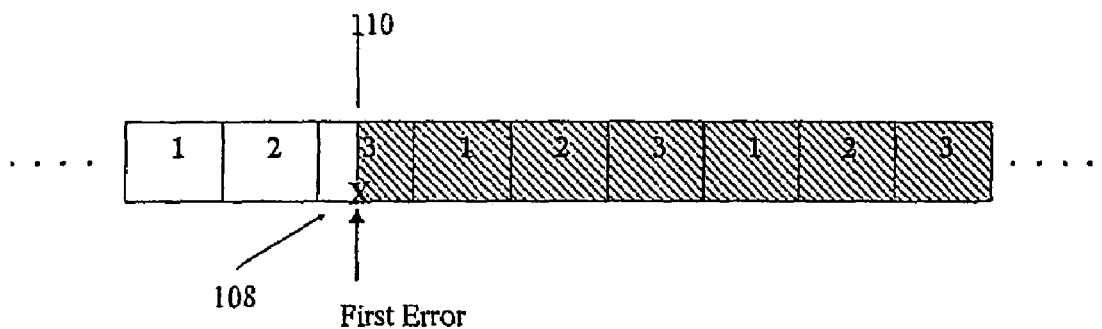

RESET=False, BYPASS=False, Error in Clean-up: When there is an error 108 in a clean-up pass 110, $\kappa^{sig}$ and σ[j] get corrupt. Thus, all following coding passes should be discarded. See FIG. 22.

Figure 16:
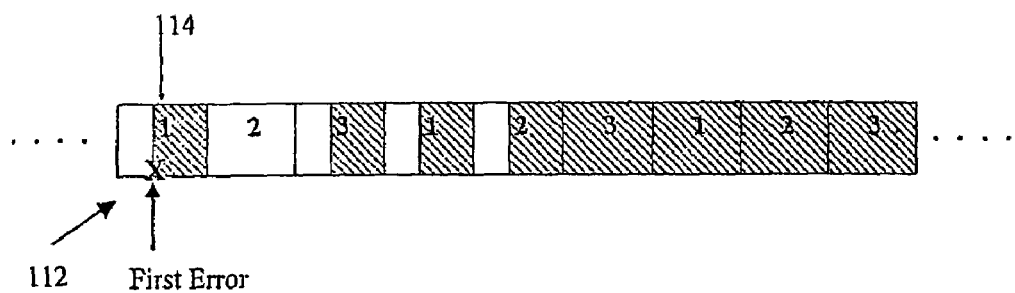

RESET=False, BYPASS=True, Error in Significance Propagation: When there is an error 112 in a significance propagation pass 114, σ[j] get corrupt. Although no future significance propagation or clean-up passes can be decoded completely, one more magnitude refinement pass can be decoded completely. Furthermore, one more each of the clean-up, significance propagation, and magnitude refinement passes can be decoded partially. See FIG. 16.

Figure 20:
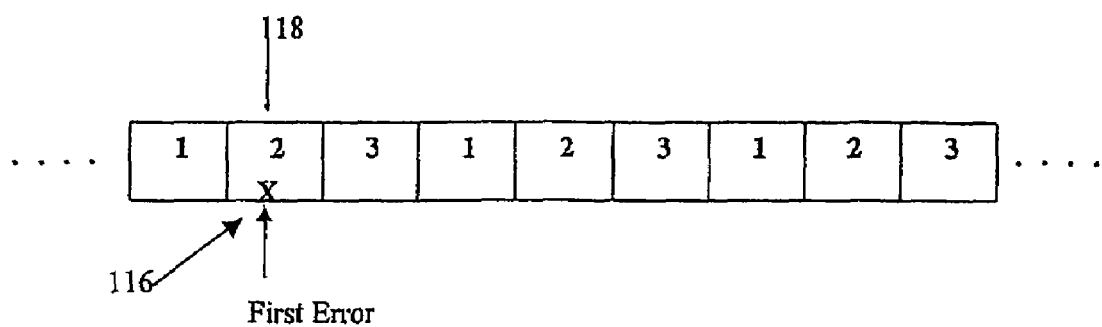

RESET=False, BYPASS=True, Error in Magnitude Refinement: Since arithmetic coding is not utilized and the bits are stored raw, a bit error 116 in the magnitude refinement pass 118 only affects a single sample (Except for the case, where byte stuffing needs to be used to avoid producing restricted marker codes). Thus, the decoder should continue decoding the current and all future coding passes. See FIG. 20.

Figure 23:
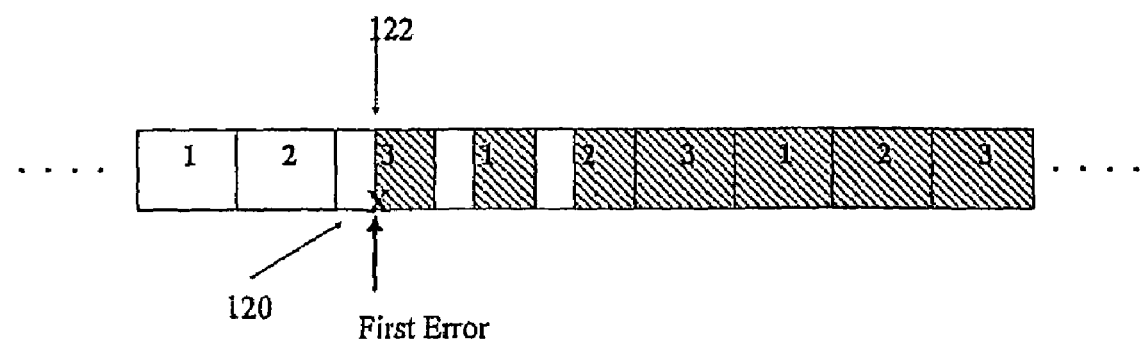

RESET=False, BYPASS=True, Error in Clean-up: When there is an error 120 in a clean-up pass 122, although $\kappa^{sig}$ and σ[j] get corrupt, one more significance propagation and magnitude refinement can be partially decoded. See FIG. 23.

Figure 17:
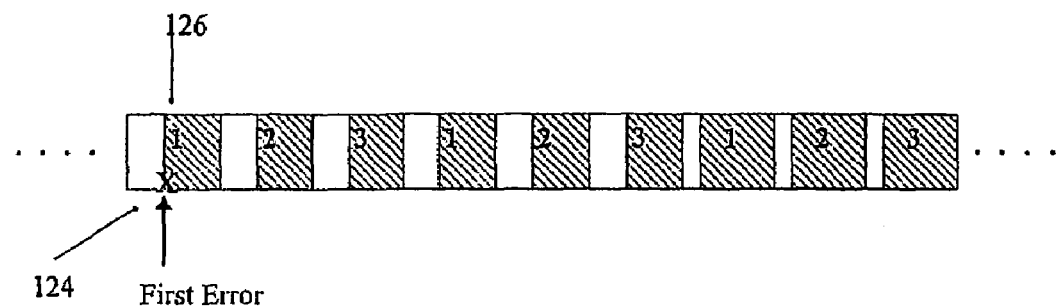

RESET=True, BYPASS=False, Error in Significance Propagation: When there is an error 124 in a significance propagation pass 126 $\kappa^{sig}$ and σ[j] get corrupt. However, since the arithmetic coding states are reset for every coding pass, partial decoding of all following coding passes is possible. See FIG. 17.

Figure 21:
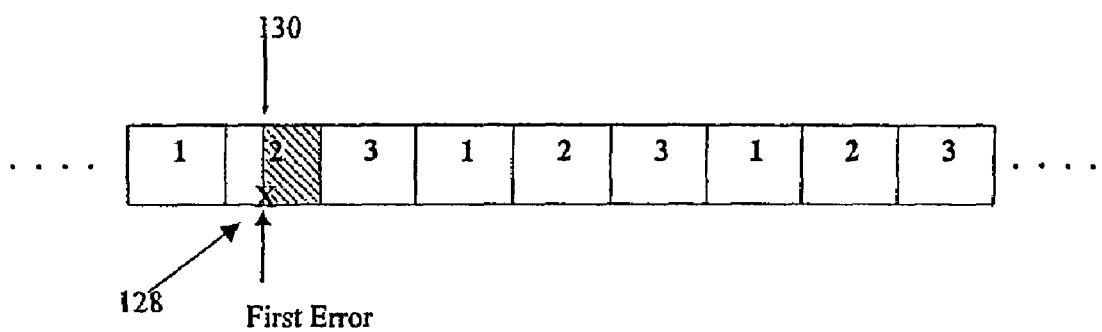

RESET=True, BYPASS=False, Error in Magnitude Refinement: An error 128 in magnitude refinement pass 130 will corrupt $\kappa^{mag}$. Since neither the significance propagation nor the clean-up passes are dependent on $\kappa^{mag}$, all such passes can be decoded. Furthermore, since the reset switch will reinitialize the $\kappa^{mag}$ for the next magnitude refinement coding pass, all future magnitude refinement coding passes can be decoded as well. See FIG. 21.

Figure 24:
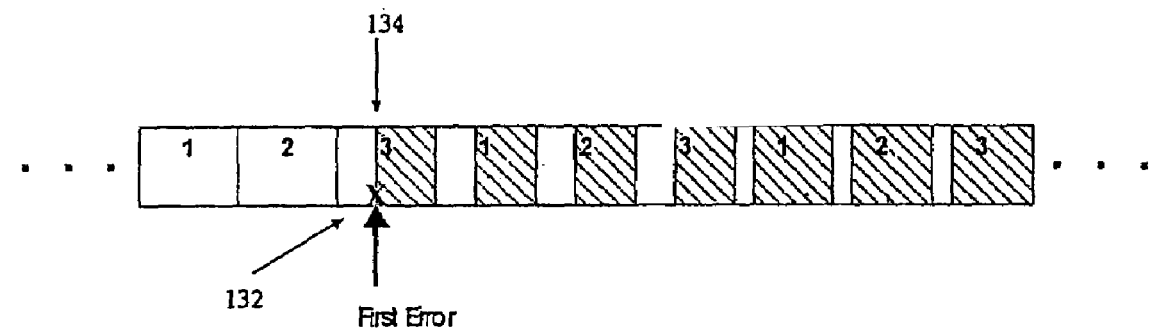

RESET=True, BYPASS=False, Error in Clean-up: When there is an error 132 in a clean-up pass 134 $\kappa^{sig}$ and σ[j] get corrupt. However, since the arithmetic coding states are reset for every coding pass, partial decoding of all following coding passes is possible. See FIG. 24.

Figure 18:
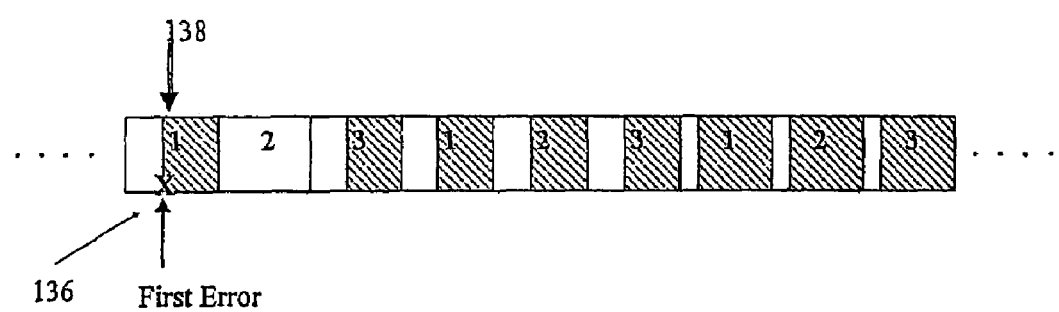

RESET=True, BYPASS=True, Error in Significance Propagation: When there is an error 136 in a significance propagation pass 138 $\kappa^{sig}$ and σ[j] get corrupt. One more magnitude refinement pass can be decoded completely and all remaining passes can be decoded partially. See FIG. 18.

RESET=True, BYPASS=True, Error in Magnitude Refinement: Since arithmetic coding is not utilized and the bits are stored raw, a bit error 116 in magnitude refinement pass 118 only affects a single sample (Except for the case, where byte stuffing needs to be used to avoid producing restricted marker codes). Thus, the decoder should continue decoding the current and all future coding passes. See FIG. 20.

RESET=True, BYPASS=True, Error in Clean-up: When there is an error 132 in a clean-up pass 134, $\kappa^{sig}$ and σ[j] get corrupt. However, since the arithmetic coding states are reset for every coding pass, partial decoding of all following coding passes is possible. See FIG. 24.

In all the above cases, the portion of the coding passes that can be salvaged is dependent on how the error propagates from one coding pass to another. This propagation is dependent on the order in which samples are visited during coding. Error propagation is also dependent on whether the codestream has been created using CAUSAL=True or CAUSAL=False. When the CAUSAL switch is turned on, the samples in future stripes are treated as insignificant when the context labels are formed. This affects error propagation. Thus, when an error occurs, the error propagation is much slower if CAUSAL=True versus when CAUSAL=False.

Figure 25:
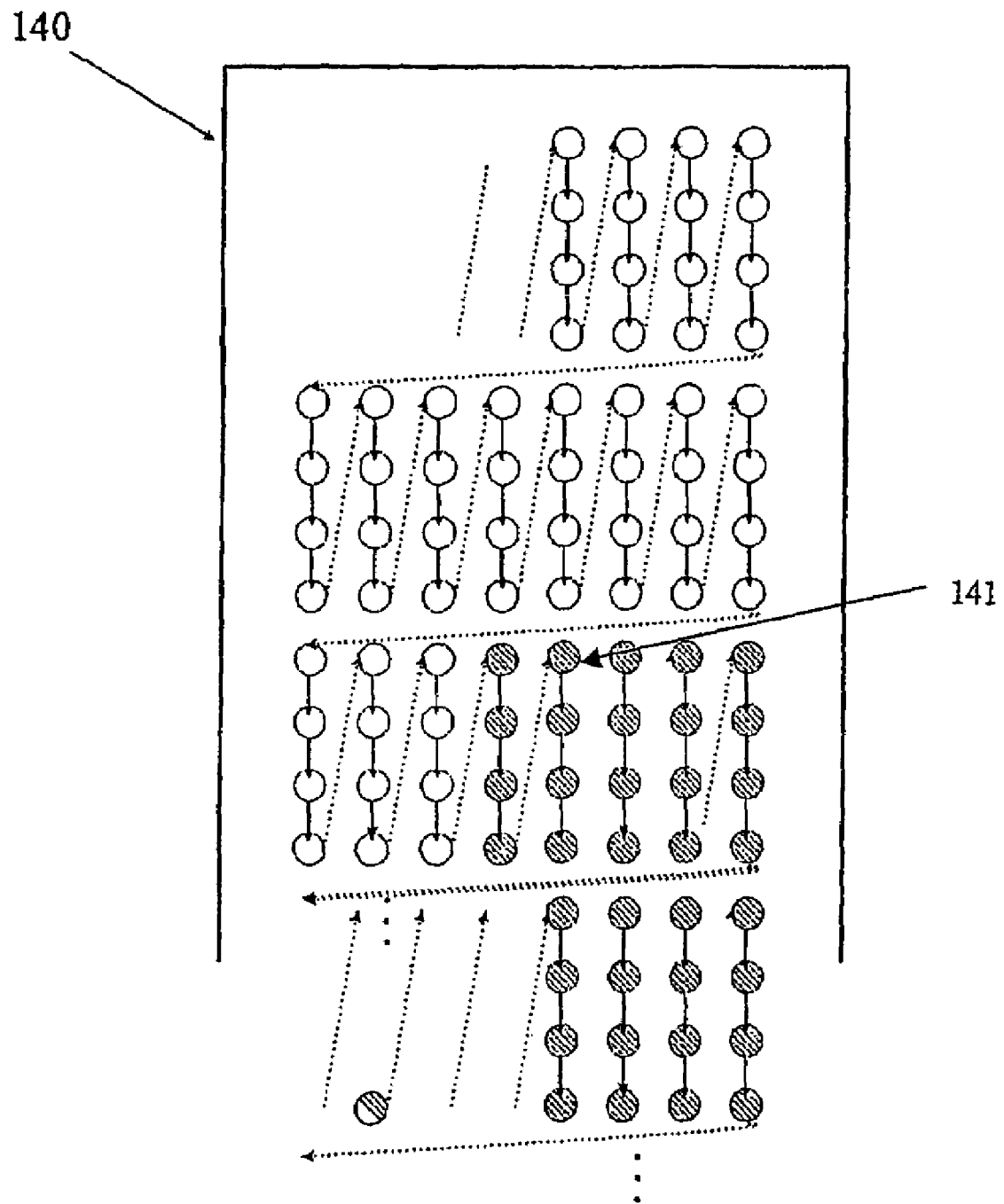
FIGS. 25-26 are examples illustrating samples that can be salvaged.
Figure 26:
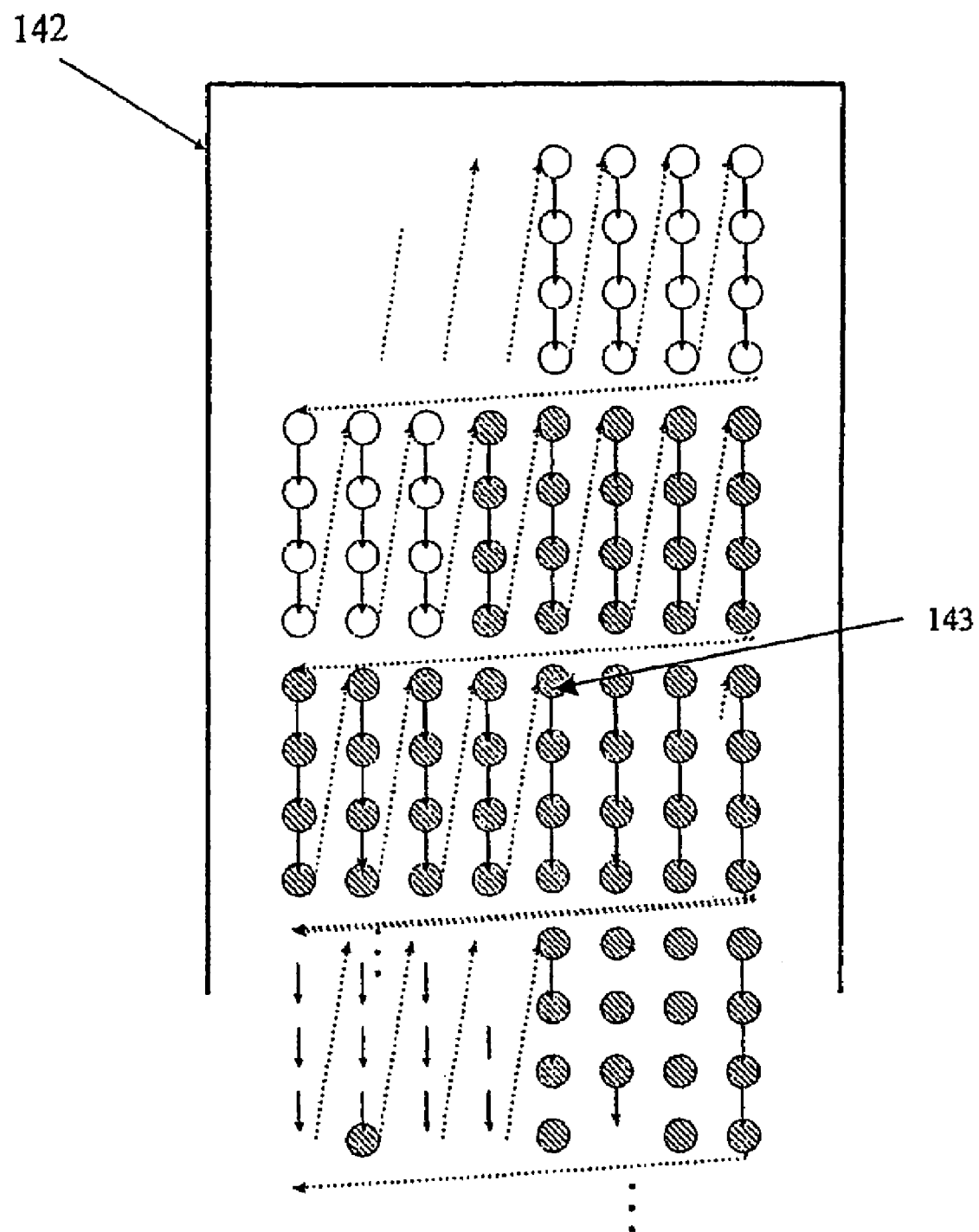

Through a detailed analysis of this error propagation, the decoder identifies all of the samples that can be salvaged in future coding passes. Examples for CAUSAL=True 140 and CAUSAL=False 142 are illustrated in FIG. 25 (CAUSAL=True) and FIG. 26 (CAUSAL=False), respectively, for the case corresponding to FIG. 15 with error locations 141 and 143 in the significance propagation pass. The samples that can be salvaged are shown as open circles and the samples that should be discarded are cross-hatched circles. For some cases, the samples that can be salvaged might not follow a simple partition such as the ones illustrated in FIG. 25 and FIG. 26. However, these samples can be tracked using a list Experimental Results In this section, the error resilience of JPEG2000 under various error conditions is considered. In all the simulations, the main header and the tile header were protected from errors, and PPM markers were utilized. Each simulation was performed 1000 times. The performances of two methods are compared. The first method is the known one that is implemented in Kakadu (KDU). In this method, the decoder is dependent on the internal error detection mechanisms of JPEG2000. Once an error is detected in a coding pass, all remaining coding passes from the current codeblock are discarded. The second method (CCP) embodies the decoding techniques described herein. Once the decoder identifies the initial error in a codeblock codestream through external means, the decoding is performed up to the byte containing the first error. The decoder then performs an analysis to identify which of the remaining coding passes can be decoded.

The performance of KDU and CCP using different modes is shown in Table 5 and Table 6, respectively. These tables present the average Peak Signal to Noise Ratio (PSNR) performances of KDU and CCP over a Binary Symmetric Channel (BSC) with Bit Error Rate (BER)=$10^{-4}$. The results in Table 6 illustrate that the utilization of the CCP decoding techniques can provide significant improvement in error resilience.

TABLE 5

The average PSNR (in dB) performances of KDU over a BSC.

| | | KDU | | | |
|---|---|---|---|---|---|
| Image | Rate (bpp) | RESET, RESTART, ERTERM | RESET, RESTART, ERTERM, CAUSAL | RESET, RESTART, ERTERM, BYPASS | RESET, RESTART, ERTERM, CAUSAL, BYPASS |
| Barbara | 0.1 | 23.34 | 23.30 | 23.31 | 23.32 |
| | 0.25 | 25.54 | 25.53 | 25.52 | 25.48 |
| | 0.5 | 26.92 | 27.01 | 26.84 | 26.98 |
| | 1.0 | 27.69 | 27.73 | 27.82 | 27.76 |
| Goldhill | 0.1 | 26.26 | 26.23 | 26.30 | 26.44 |
| | 0.25 | 27.86 | 27.83 | 27.95 | 27.84 |
| | 0.5 | 28.86 | 28.87 | 28.96 | 29.08 |
| | 1.0 | 29.60 | 29.82 | 29.75 | 29.88 |
| Lenna | 0.1 | 27.55 | 27.53 | 27.50 | 27.49 |
| | 0.25 | 29.88 | 29.58 | 27.77 | 29.59 |
| | 0.5 | 30.61 | 30.62 | 30.78 | 30.54 |
| | 1.0 | 31.31 | 31.12 | 31.39 | 31.29 |

TABLE 6

The average PSNR (in dB) performances of CCP over a BSC.

| | | CCP | | | |
|---|---|---|---|---|---|
| Image | Rate (bpp) | RESET, RESTART, ERTERM | RESET, RESTART, ERTERM, CAUSAL | RESET, RESTART, ERTERM, BYPASS | RESET, RESTART, ERTERM, CAUSAL, BYPASS |
| Barbara | 0.1 | 23.60 | 23.61 | 23.54 | 23.62 |
| | 0.25 | 26.21 | 26.39 | 26.10 | 26.28 |
| | 0.5 | 28.01 | 28.41 | 27.93 | 28.34 |
| | 1.0 | 29.27 | 29.75 | 29.20 | 29.57 |
| Goldhill | 0.1 | 26.61 | 26.67 | 26.61 | 26.97 |
| | 0.25 | 28.53 | 28.65 | 28.54 | 28.62 |
| | 0.5 | 29.83 | 30.18 | 29.82 | 30.26 |
| | 1.0 | 30.94 | 31.64 | 30.93 | 31.48 |
| Lenna | 0.1 | 27.94 | 28.10 | 27.88 | 28.03 |
| | 0.25 | 30.75 | 30.78 | 30.52 | 30.70 |
| | 0.5 | 31.82 | 32.34 | 31.80 | 32.00 |
| | 1.0 | 32.78 | 33.24 | 32.58 | 33.02 |

Figure 27:
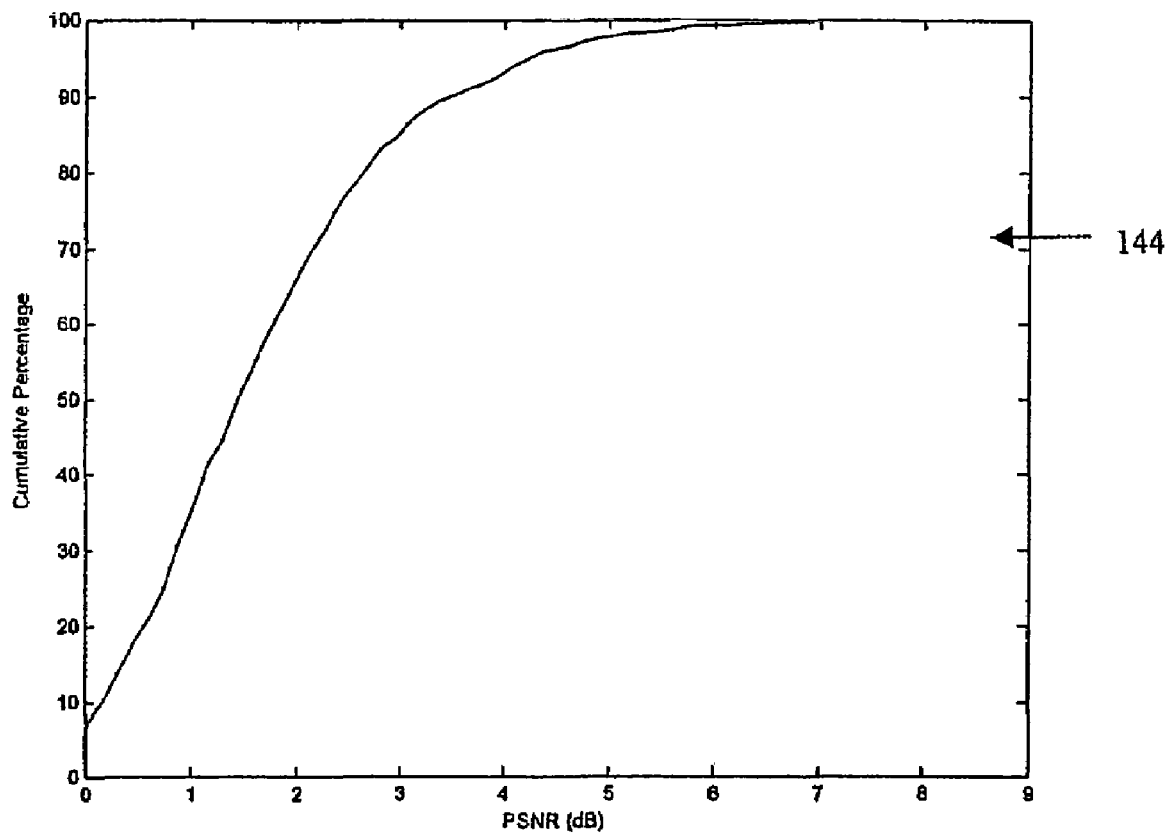
FIG. 27 is the distribution of the PSNR gain provided by CCP over KDU.

To analyze these gains further, consider the plot 144 presented in FIG. 27. In the figure, the KDU and CCP methods are compared at 1.0 bits/pixel over the BSC channel with BER $10^{-4}$ using the Lenna image. In these simulations, the JPEG2000 codestreams were generated using the BYPASS, RESET, RESTART, CAUSAL, and ERTERM modes. This plot illustrates the distribution of the PSNR gain obtained by using CCP instead of KDU. The x-axis of the plot indicates PSNR (in dB), and the y-axis indicates the cumulative percentage of realizations. From this plot, it can be inferred that the gain provided by CCP in these simulations has been as large as 8.6 dB. Also CCP provided a gain greater than 2.7 dB in roughly 20% of the cases;

JPEG2000 Imaging System

JPEG-2000 provides state-of-the-art low bit-rate compression performance, progressive transmission by quality, resolution, component, or spatial locality, lossy and lossless compression, random access to the bitstream, pan & zoom rotation & cropping, region of interest coding by progression and limited memory implementations. Furthermore, a single JPEG2000 codestream can provide all of these features to many different users over wired and wireless networks using different display devices simultaneously. Incorporation of the present invention via hardware or software into the varying wireless display devices enhances the image quality seen by the user.

Figure 28:
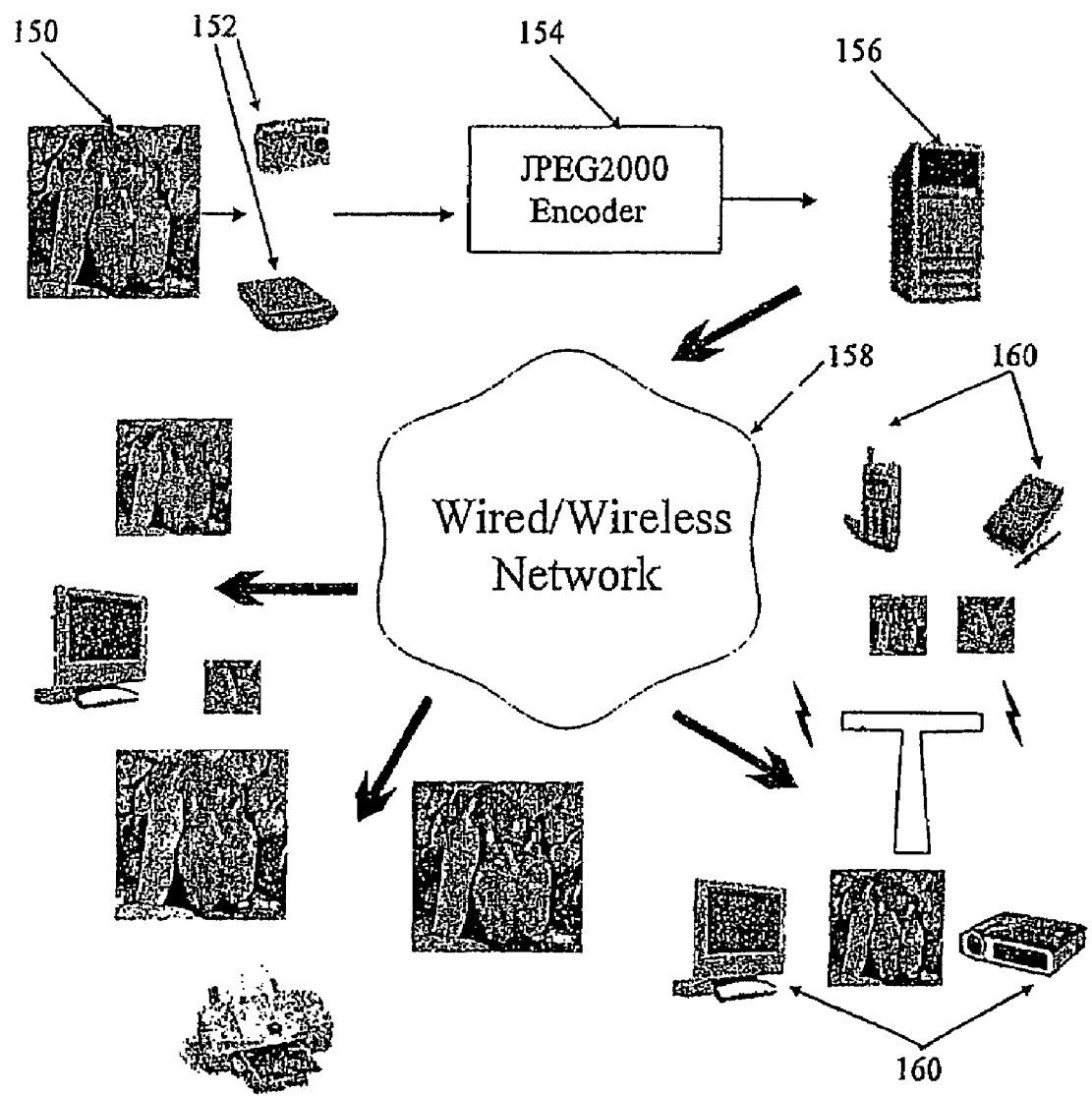
FIG. 28 is a block diagram of a JPEG-2000 imaging and distribution system.

As shown in FIG. 28, image content 150 can be provided by many different sources 152 such as cameras or scanners worldwide using a variety of JPEG2000 compatible encoders 154 that compress image data into the JPEG2000 syntax. The only encoding requirement is that the RESTART and ERTERM switches must be set to encode for noisy channels. This increases the file size by a couple percent but is necessary to distribute the images over corrupt channels. In addition, the content provider will determine the state of the RESET, BYPASS and CAUSAL switches. As described previously, the decoding techniques exploit the state of these switches and, in some cases, knowledge about the occurrence of channel errors to improve the quality of the decoded images.

As illustrated, the encoded images are transmitted and stored in a centralized server 156. The server receives one or more requests for a particular image, determines what portion of the image (packets of the JPEG2000 codestream) should be sent based on the user request and the particulars of the user's display, and transmits the data over wired and/or wireless networks 158 to the user(s). The latency experienced by a user does depend on the bandwidth of the network but is typically at most a few seconds due to the effective compression provided by JPEG2000's progressive transmission features. Note, the encoded image data can be distributed directly to users without archival in a central server.

The hardware and/or software that implements the present invention resides in the decoder at the various display devices 160, both wired and wireless, that receive JPEG2000 codestreams via channels that may be corrupt. Typical display devices 160 include computer monitors, laptop computers, cell phones, handheld displays such as palms, electronic books, personal GPS systems, printers, projectors and surveillance system displays. The present invention may be included directly in or together with the JPEG2000 decoder chip, provided as part of a software decoder or browser or downloaded as a software plug-in. The cost to the user or display device is a small increase in the number of calculations required to decode image data. This is more than offset by the increase in image quality.

While several illustrative embodiments of the invention have been shown and described, numerous variations and alternate embodiments will occur to those skilled in the art. Such variations and alternate embodiments are contemplated, and can be made without departing from the spirit and scope of the invention as defined in the appended claims.

We claim:

1. A method of decoding a corrupt codestream in a computer readable medium, wherein data from an underlying digital image have been partitioned into partition sets and encoded by an encoder, and wherein rules governing dependencies of said data within the partition sets are known, comprising the following steps:

employing a decoder for observing partitions imposed by the encoder, detecting an error in a partition set in which data that follow the error depend on said error, analyzing the dependencies within the partition set, determining at least one section of encoded data that follow the error in the partition set that can be salvaged, and decoding said sections of encoded image data in the partition set.

2. The method of claim 1, wherein said data are partitioned to allow decoding of different spatial sections of the digital image or more efficient compression for non-stationary sources.

3. The method of claim 1, wherein the dependencies are analyzed according to a state of certain switches set during encoding.

4. The method of claim 3, wherein salvageable data are determined in accordance with the state of said switches and an occurrence of the error.

5. The method of claim 4, further comprising the steps of:
determining how said error propagates through the codestream based on the state of said switches, and decoding the sections of the codestream that are not affected by the error.

6. The method of claim 5, wherein no external information on a location of the error in the codestream is available.

7. The method of claim 5, wherein external error detection provides information on a location of errors within data sections.

8. The method of claim 1, wherein the digital image is encoded in a JPEG2000 codestream.

9. The method of claim 8, wherein a sequence of digital images is encoded in a file format containing JPEG2000 codestreams.

10. The method of claim 9, wherein the file format is Motion JPEG2000.

11. The method of claim 1, wherein the rules also govern dependencies between partition sets, and further comprising the step of determining what data within dependent partition sets can be salvaged based on an occurrence of the error in the partition set.

12. A method of decoding a corrupt JPEG2000 codestream in a computer readable medium, wherein data from an underlying digital image have been partitioned into partition sets and encoded in significance propagation, magnitude refinement, and clean-up passes by a JPEG2000 encoder, and wherein rules governing dependencies within partition sets are known, comprising the following steps:
employing a decoder for
observing a partition imposed by the JPEG2000 encoder,
detecting an error in a partition set in which data that follow the error depend on said error,
analyzing the dependencies within the partition set in accordance with a state of a RESET and a BYPASS switch to determine how errors propagate through the codestream during the significance propagation, magnitude refinement, and clean-up passes, and determining at least one section of encoded image data that follow said error in the partition set that can be salvaged, and
decoding said sections of encoded image data in the partition set.

13. The method of claim 12, wherein the partition sets are codeblocks.

14. The method of claim 13, wherein the data are further partitioned into partition sets given by packets and the rules also govern dependencies between partition sets, further comprising the step of determining what dependent partition sets can be completely or partially salvaged based on an occurrence of the error in the partition set.

15. The method of claim 12, wherein external error detection provides information on a location of said error in the codestream.

16. The method of claim 15, wherein the dependencies are analyzed and salvageable sections of encoded data determined through the steps of:

When an error occurs in the significance propagation pass of a given codeblock and RESET=False, BYPASS=False, decoding a portion of a next magnitude refinement pass within said codeblock in accordance with uncorrupt portions of $\kappa$sig and $\sigma[j]$;

When an error occurs in the magnitude refinement pass of a given codeblock and RESET=False, BYPASS=False, discarding all following magnitude refinement coding passes within said codeblock and decoding the two other types of coding passes;

When an error occurs in the clean-up pass of a given codeblock and RESET=False, BYPASS=False, discarding all following coding passes within said codeblock;

When an error occurs in the significance propagation pass of a given codeblock and RESET=False, BYPASS=True, decoding the next significance propagation and clean up passes partially, decoding the next magnitude refinement pass completely, decoding one more magnitude refinement pass partially, and discarding all of the following coding passes within said codeblock;

When an error occurs in the magnitude refinement pass of a given codeblock and RESET=False, BYPASS=True, continue decoding the current and all future coding passes within said codeblock;

When an error occurs in a clean-up pass of a given codeblock and RESET=False, BYPASS=True, decoding portions of the next significance propagation and magnitude refinement passes within said codeblock in accordance with the uncorrupt portions of $\kappa$sig and $\sigma[j]$;

When an error occurs in the significance propagation pass of a given codeblock and RESET=True, BYPASS=False, decoding portions of all following coding passes within said codeblock in accordance with the uncorrupt portions of $\kappa$sig and $\sigma[j]$;

When an error occurs in the magnitude refinement pass of a given codeblock and RESET=True, BYPASS=False, continue decoding the current and all future coding passes within said codeblock;

When an error occurs in a clean-up pass of a given codeblock and RESET=True, BYPASS=False, decoding portions of all following coding passes within said codeblock in accordance with the uncorrupt portions of $\kappa$sig and $\sigma[j]$;

When an error occurs in the significance propagation pass of a given codeblock and RESET=True, BYPASS=True, completely decoding one more magnitude refinement pass and decoding portions of the remaining coding passes within said codeblock in accordance with the uncorrupt portions of $\kappa$sig and $\sigma[j]$;

When an error occurs in the magnitude refinement pass of a given codeblock and RESET=True, BYPASS=True, continue decoding the current and all future coding passes within said codeblock; and When an error occurs in a clean-up pass of a given codeblock and RESET=True, BYPASS=True, decoding portions of all following coding passes within said codeblock in accordance with the uncorrupt portions of $\kappa$sig and $\sigma[j]$.

17. The method of claim 12, wherein no external information on a location of the error in the codestream is available.

18. The method of claim 17, wherein the dependencies are analyzed and salvageable sections of encoded data determined according to the steps of:

When an error occurs in the significance propagation pass of a given codeblock and RESET=False, BYPASS=False, discarding all of the following coding passes within said codeblock; When an error occurs in the magnitude refinement of a given codeblock pass and RESET=False, BYPASS=False, discarding all following magnitude refinement coding passes and decoding the two other types of coding passes within said codeblock;

When an error occurs in a clean-up of a given codeblock pass and RESET=False, BYPASS=False, discarding all of the following coding passes within said codeblock;

When an error occurs in the significance propagation pass of a given codeblock and RESET=False, BYPASS=True, discarding all of the following significance propagation and clean-up passes and decoding the next magnitude refinement pass within said codeblock;

When an error occurs in the magnitude refinement pass of a given codeblock and RESET=False, BYPASS=True, continue decoding the current and all future coding passes within said codeblock;

When an error occurs in a clean-up pass of a given codeblock and RESET=False, BYPASS=True, discarding all of the following coding passes within said codeblock;

When an error occurs in the significance propagation pass of a given codeblock and RESET=True, BYPASS=False, discarding all of the following coding passes within said codeblock;

When an error occurs in the magnitude refinement pass of a given codeblock and RESET=True, BYPASS=False, continue decoding the current and all future coding passes within said codeblock;

When an error occurs in a clean-up pass of a given codeblock and RESET=True, BYPASS=False, discarding all of the following coding passes within said codeblock;

When an error occurs in the significance propagation pass of a given codeblock and RESET=True, BYPASS=True, discarding future significance propagation and clean-up passes and decoding one more magnitude refinement pass within said codeblock;

When an error occurs in the magnitude refinement pass of a given codeblock and RESET=True, BYPASS=True, continue decoding the current and all future coding passes within said codeblock; and When an error occurs in a clean-up pass of a given codeblock and RESET=True, BYPASS=True, discarding all of the following coding passes within said codeblock.

19. The method of claim 12, wherein the rules further include a CAUSAL switch that govern the dependencies.

20. A method of decoding corrupt JPEG2000 codestreams in a computer readable medium where no external information on a location of errors is available, wherein data from underlying digital imagery have been partitioned into partition sets and encoded in significance propagation, magnitude refinement, and clean-up passes, and rules governing dependencies within and between said partition sets are defined by a state of RESET and BYPASS switches, comprising the steps of:

employing a decoder for

When an error occurs in the significance propagation pass of a given codeblock and RESET=False, BYPASS=False, discarding all of the following coding passes within said codeblock;

When an error occurs in the magnitude refinement of a given codeblock pass and RESET=False, BYPASS=False, discarding all following magnitude refinement coding passes and decoding the two other types of coding passes within said codeblock;

When an error occurs in a clean-up of a given codeblock pass and RESET=False, BYPASS=False, discarding all of the following coding passes within said codeblock;

When an error occurs in the significance propagation pass of a given codeblock and RESET=False, BYPASS=True, discarding all of the following significance propagation and clean-up passes and decoding the next magnitude refinement pass within said codeblock;

When an error occurs in the magnitude refinement pass of a given codeblock and RESET=False, BYPASS=True, continue decoding the current and all future coding passes within said codeblock;

When an error occurs in a clean-up pass of a given codeblock and RESET=False, BYPASS=True, discarding all of the following coding passes within said codeblock;

When an error occurs in the significance propagation pass of a given codeblock and RESET=True, BYPASS=False, discarding all of the following coding passes within said codeblock;

When an error occurs in the magnitude refinement pass of a given codeblock and RESET=True, BYPASS=False, continue decoding the current and all future coding passes within said codeblock;

When an error occurs in a clean-up pass of a given codeblock and RESET=True, BYPASS=False, discarding all of the following coding passes within said codeblock;

When an error occurs in the significance propagation pass of a given codeblock and RESET=True, BYPASS=True, discarding future significance propagation and clean-up passes and decoding one more magnitude refinement pass within said codeblock;

When an error occurs in the magnitude refinement pass of a given codeblock and RESET=True, BYPASS=True, continue decoding the current and all future coding passes within said codeblock; and When an error occurs in a clean-up pass of a given codeblock and RESET=True, BYPASS=True, discarding all of the following coding passes within said codeblock.

21. The method of claim 20, wherein the rules further include a CAUSAL switch that governs the dependencies.

22. A method of decoding corrupt JPEG2000 codestreams in a computer readable medium where external information on a location of errors is available, wherein data from underlying digital imagery have been partitioned into partition sets and encoded in significance propagation, magnitude refinement, and clean-up passes, and rules governing dependencies within and between said partition sets are defined by a state of RESET and BYPASS switches, comprising the steps of:

employing a decoder for

When an error occurs in the significance propagation pass of a given codeblock and RESET=False, BYPASS=False, decoding a portion of the next magnitude refinement pass within said codeblock in accordance with the uncorrupt portions of $\kappa sig$ and $\sigma[j]$;

When an error occurs in the magnitude refinement pass of a given codeblock and RESET=False, BYPASS=False, discarding all following magnitude refinement coding passes within said codeblock and decoding the two other types of coding passes;

When an error occurs in a clean-up pass of a codeblock and RESET=False, BYPASS=False, discarding all of the following coding passes within said codeblock;

When an error occurs in the significance propagation pass of a given codeblock and RESET=False, BYPASS=True, decoding the next significance propagation and clean up passes partially, decoding the next magnitude refinement pass completely, decoding one more magnitude refinement pass partially, and discarding all of the following coding passes within said codeblock;

When an error occurs in the magnitude refinement pass of a given codeblock and RESET=False, BYPASS=True, continue decoding the current and all future coding passes within said codeblock;

When an error occurs in a clean-up pass of a given codeblock and RESET=False, BYPASS=True, decoding portions of the next significance propagation and magnitude refinement passes within said codeblock in accordance with the uncorrupt portions of κsig and σ[j];

When an error occurs in the significance propagation pass of a given codeblock and RESET=True, BYPASS=False, decoding portions of all following coding passes within said codeblock in accordance with the uncorrupt portions of κsig and σ[j];

When an error occurs in the magnitude refinement pass of a given codeblock and RESET=True, BYPASS=False, continue decoding the current and all future coding passes within said codeblock;

When an error occurs in a clean-up pass of a given codeblock and RESET=True, BYPASS=False, decoding portions of all following coding passes within said codeblock in accordance with the uncorrupt portions of κsig and σ[j];

When an error occurs in the significance propagation pass of a given codeblock and RESET=True, BYPASS=True, completely decoding one more magnitude refinement pass and decoding portions of the remaining coding passes within said codeblock in accordance with the uncorrupt portions of κsig and σ[j];

When an error occurs in the magnitude refinement pass of a given codeblock and RESET=True, BYPASS=True, continue decoding the current and all future coding passes within said codeblock; and When an error occurs in a clean-up pass of a given codeblock and RESET=True, BYPASS=True, decoding portions of all following coding passes within said codeblock in accordance with the uncorrupt portions of κsig and σ[j].

23. The method of claim 22, wherein the rules further include a CAUSAL switch that governs the dependencies.

24. A method of transmitting image data, comprising the steps of:
encoding the image data in a computer readable medium with a JPEG2000 compatible encoder with a RESTART switch enabled into a JPEG2000 codestream,
transmitting the JPEG2000 codestream over a channel that is susceptible to errors, and
decoding corrupted codestream with a JPEG2000 decoder that is configured to observe partitions imposed by the JPEG2000 encoder, wherein for at least one partition at least some data that follow the error depend on said error, analyze dependencies within the partition sets in accordance with a state of the RESET and BYPASS switches to determine how errors propagate through the codestream during a significance propagation, magnitude refinement, and clean-up passes, and when errors occur, determine at least one section of encoded image data that follow the error in the partition set that can be salvaged, and decode said sections.

25. The method of claim 24, wherein the JPEG2000 codestream comprises a plurality of packets, further comprising:
storing the packets in a server,
in response to end-user requests, extracting only those additional packets of the codestream required to satisfy the end-user request,
transmitting the packets over the channel that is susceptible to errors, and decoding corrupted packets.

26. A JPEG2000 imaging system, comprising:
one or more JPEG2000 compatible image encoders used to produce content in the form of JPEG2000 codestreams in a computer readable medium,
a server that stores a JPEG2000 codestream for each image,
a distribution network that includes channels that are susceptible to errors, and
one or more display devices provided with JPEG2000 decoders that are configured to observe partitions imposed by the JPEG2000 encoder, analyze dependencies within partition sets in accordance with a state of RESET and BYPASS switches to determine how errors propagate through the codestream during a significance propagation, magnitude refinement, and clean-up passes, and when an error occurs in a partition in which data that follow the error depend on said error, determine at least one section of encoded image data that follow the error in the partition set that can be salvaged and decode said sections.

27. The system of claim 26, wherein the decoder is so configured by an after-market downloadable plug-in.

28. A display device including a JPEG2000 decoder that is configured to observe the partitions imposed by a JPEG2000 encoder, analyze the dependencies within the partition sets in accordance with the state of the RESET and BYPASS switches to determine how errors propagate through the codestream during the significance propagation, magnitude refinement, and clean-up passes, and when an error occurs in a partition in which data that follow the error depend on said error, determine at least one section of encoded image data that follow the error in the partition set that can be salvaged and decode those sections.

29. A display device of claim 28, wherein the decoder analyzes the dependencies between partition sets and when errors occur, determines what dependent partitions sets can be salvaged.

* * * * *

UNITED STATES PATENT AND TRADEMARK OFFICE
CERTIFICATE OF CORRECTION

PATENT NO. : 7,580,582 B2
APPLICATION NO. : 10/534620
DATED : August 25, 2009
INVENTOR(S) : Marcellin et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1047 days.

Signed and Sealed this

Fourteenth Day of December, 2010

David J. Kappos
*Director of the United States Patent and Trademark Office*